US012525172B2

(12) United States Patent
Jang et al.

(10) Patent No.: US 12,525,172 B2
(45) Date of Patent: Jan. 13, 2026

(54) DISPLAY PANEL, DISPLAY DEVICE INCLUDING DISPLAY PANEL, AND PERSONAL IMMERSIVE SYSTEM USING DISPLAY DEVICE

(71) Applicant: LG DISPLAY CO., LTD., Seoul (KR)

(72) Inventors: Kyung Jin Jang, Paju-si (KR); Boem Jin Kim, Paju-si (KR); Bong Choon Kwak, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/747,467

(22) Filed: May 18, 2022

(65) Prior Publication Data

US 2022/0383803 A1 Dec. 1, 2022

(30) Foreign Application Priority Data

May 31, 2021 (KR) ........................ 10-2021-0070214

(51) Int. Cl.
*G09G 3/32* (2016.01)
*H04N 13/344* (2018.01)

(52) U.S. Cl.
CPC ............ *G09G 3/32* (2013.01); *H04N 13/344* (2018.05); *G09G 2300/0443* (2013.01); *G09G 2310/0267* (2013.01); *G09G 2310/0286* (2013.01); *G09G 2310/0291* (2013.01); *G09G 2310/0294* (2013.01); *G09G 2310/0297* (2013.01); *G09G 2310/08* (2013.01); *G09G 2360/04* (2013.01)

(58) Field of Classification Search
CPC .. G09G 3/3688; G09G 3/2092; G09G 3/3677; G09G 2310/0264; G09G 2310/0297; G09G 3/32; G09G 2300/0443; G09G 2310/0267; G09G 2310/0286; G09G 2310/0291; G09G 2310/0294; G09G 2310/08; G09G 2360/04; H04N 13/344
See application file for complete search history.

(56) References Cited

U.S. PATENT DOCUMENTS 7,180,497 B2 * 2/2007 Lee ...................... G09G 3/3685
345/98
7,382,344 B2 * 6/2008 Lee ...................... G09G 3/3688
345/99

(Continued)

FOREIGN PATENT DOCUMENTS

CN 1432989 A 7/2003
CN 1622180 A 6/2005

(Continued)

OTHER PUBLICATIONS

Chinese Office Action dated Mar. 29, 2024 issued in Patent Application No. 202210540066.4 (21 pages).

(Continued)

*Primary Examiner* — Michael J Jansen, II
(74) *Attorney, Agent, or Firm* — Fish & Richardson P.C.

(57) ABSTRACT

A display panel, a display device including the display panel, and a personal immersive system using the display device includes a sample & holder that sequentially samples a data voltage sequentially outputted from a demultiplexer and then simultaneously output the data voltage to a plurality of data lines, and sub-pixels that sequentially charge the data voltage inputted from the sample & holder in response to a scan pulse.

17 Claims, 15 Drawing Sheets

(56) References Cited

U.S. PATENT DOCUMENTS 7,518,578 B2* 4/2009 Shin ........................ H03M 9/00 327/241
7,667,675 B2* 2/2010 Kyeong ............... G09G 3/3688 345/98
7,692,673 B2* 4/2010 Shin ....................... G09G 3/325 345/694
7,728,806 B2* 6/2010 Shin ..................... G09G 3/3283 345/98
7,728,827 B2* 6/2010 Shin ..................... G09G 3/3283 345/98
7,782,277 B2* 8/2010 Shin ....................... G09G 3/325 345/82
8,018,401 B2* 9/2011 Shin ..................... G09G 3/3275 345/98
8,188,898 B2* 5/2012 Tu ........................ G09G 3/3648 345/94
8,487,859 B2* 7/2013 Kim ..................... G09G 3/3688 345/100
8,988,510 B2* 3/2015 Min ....................... G02B 30/24 348/51
9,147,619 B2* 9/2015 Lee ........................ G09G 3/006
9,792,856 B2* 10/2017 Park ..................... G09G 3/3233
9,865,209 B2* 1/2018 Oh ....................... G09G 3/3648
10,204,563 B2* 2/2019 Takahashi ........... H01L 27/1225
10,621,941 B2* 4/2020 Horiuchi ............. H01L 27/1225
10,650,766 B2* 5/2020 Kurokawa ............. G06N 3/048
10,665,176 B2* 5/2020 Kwon .................. G09G 3/3291
11,017,726 B2* 5/2021 Kim ..................... G09G 3/2003
11,205,385 B2* 12/2021 Feng .................... G09G 3/3266
11,328,684 B2* 5/2022 Tagawa ................ G09G 3/3688
11,462,176 B2* 10/2022 Choi .................... G09G 3/3208
2003/0085865 A1* 5/2003 Lee ...................... G09G 3/3688 345/98
2003/0132907 A1* 7/2003 Lee ...................... G09G 3/3688 345/98
2004/0125067 A1* 7/2004 Kim ..................... G09G 3/3696 345/98
2005/0100057 A1* 5/2005 Shin ........................ H03M 9/00 370/536
2005/0110727 A1* 5/2005 Shin ......................... G09G 3/20 345/76
2005/0140666 A1* 6/2005 Shin ..................... G09G 3/3283 345/211
2005/0259052 A1* 11/2005 Shin ....................... G09G 3/325 345/77
2005/0264495 A1* 12/2005 Shin ....................... G09G 3/325 345/76
2005/0270257 A1* 12/2005 Shin ..................... G09G 3/3275 345/76
2007/0030192 A1 2/2007 Son et al.
2008/0150871 A1 6/2008 Park
2008/0170027 A1* 7/2008 Kyeong ............... G09G 3/3688 345/100
2009/0015574 A1* 1/2009 Kim ..................... G09G 3/3688 345/94
2011/0025678 A1* 2/2011 Chung ................. G09G 3/3233 345/82
2011/0032129 A1* 2/2011 Tu ........................ G09G 3/3685 341/122
2011/0032249 A1 2/2011 Moon
2011/0149047 A1* 6/2011 Min ..................... G09G 3/3666 348/51
2011/0157161 A1* 6/2011 Choi ...................... G09G 3/003 345/419
2012/0139892 A1* 6/2012 Oh ....................... G09G 3/3648 345/212
2015/0090961 A1* 4/2015 Lee ........................ G09G 3/006 257/40
2016/0071463 A1* 3/2016 Takahashi ............ G09G 3/3291 327/109
2016/0098956 A1* 4/2016 Park ..................... G09G 3/3233 345/77
2018/0211620 A1* 7/2018 Kurokawa .......... H01L 27/1225
2019/0005889 A1* 1/2019 Kwon ...................... G09G 3/30
2019/0333464 A1* 10/2019 Horiuchi .............. G09G 3/3611
2020/0082766 A1* 3/2020 Kim ..................... G09G 3/2003
2021/0035501 A1* 2/2021 Feng .................... G09G 3/3283
2021/0375228 A1* 12/2021 Tagawa ................ G09G 3/3688
2022/0199035 A1* 6/2022 Choi .................... G09G 3/3275
2022/0383803 A1* 12/2022 Jang ......................... G09G 3/32

FOREIGN PATENT DOCUMENTS

| | | | |
|---|---|---|---|
| CN | 1637794 | A | 7/2005 |
| CN | 1702724 | A | 11/2005 |
| CN | 1753072 | A | 3/2006 |
| CN | 1932939 | A | 3/2007 |
| CN | 101577104 | A | 11/2009 |
| CN | 102543016 | A | 7/2012 |
| CN | 108615504 | A | 10/2018 |
| KR | 2003-0038332 | A | 5/2003 |
| KR | 20030061553 | A | 7/2003 |
| KR | 20120026574 | A | 3/2012 |
| KR | 10-2017-0047314 | A | 5/2017 |
| KR | 20170077820 | A | 7/2017 |
| KR | 10-2018-0115205 | A | 10/2018 |
| KR | 10-19694440000 | B1 | 4/2019 |
| KR | 10-2019-0136400 | A | 12/2019 |

OTHER PUBLICATIONS

Chinese Office Action dated Jul. 30, 2024 issued in Patent Application No. CN 202210540066.4 w/English Translation (18 pages).

Office Action in Korean Appln. No. 10-2021-0070214, mailed on Aug. 26, 2025, 18 pages (with English translation).

* cited by examiner

DISPLAY PANEL, DISPLAY DEVICE INCLUDING DISPLAY PANEL, AND PERSONAL IMMERSIVE SYSTEM USING DISPLAY DEVICE

CROSS-REFERENCE TO RELATED APPLICATION

This application claims the priority of Korean Patent Application No. 10-2021-0070214, filed on May 31, 2021, which is hereby incorporated by reference in its entirety.

BACKGROUND

Field of the Disclosure

The present disclosure relates to a display panel, a display device including the display panel, and a personal immersive system using the display device.

Description of the Background

Virtual reality technology is developing the fastest in defense, architecture, tourism, film, multimedia, and game fields. Virtual reality refers to a specific environment or situation that feels similar to the real environment using stereoscopic image technology.

Personal immersive devices have been developed in various forms such as a head mounted display (HMD), a face mounted display (FMD), and an eye glass-type display (EGD). The personal immersive devices are divided into a virtual reality (VR) device and an augmented reality (AR) device.

Since the distance between user's eyes and a display panel is short in the personal immersive device, the display panel is manufactured as a lightweight and compact panel in which high-resolution pixels are arranged. Such a display panel includes many pads to which a data signal corresponding to pixel data and a driving signal are applied, and as the resolution increases, more pads are required. Output pads of a drive integrated circuit (IC) for driving pixels are bonded to the display panel with an anisotropic conductive film (hereinafter, referred to as "ACF") interposed therebetween. In this case, the output pads of the drive IC and the pads of the display panel need to be bonded to each other one to one without electrical contact failure such as a short circuit.

Since the display panel of the personal immersive device has a small size and high-resolution pixels arranged therein, many pads are disposed at a high density. As a result, the display panel of the personal immersive device has a fine pitch between the pads, so it is difficult to bond the display panel to the drive IC without electrical contact failure.

SUMMARY

Accordingly, the present disclosure is to solve the aforementioned needs and/or problems.

The present disclosure provides a display panel, a display device including the display panel, and a personal immersion system using the display device, capable of bonding a drive IC to a high-resolution display panel without electrical contact failure.

It should be noted that the present disclosure is not limited to the above-described features, and other features of the present disclosure will be apparent to those skilled in the art from the following descriptions.

The display panel according to an aspect of the present disclosure may include: a demultiplexer configured to sequentially output a data voltage through M (M being a positive integer greater than or equal to 2) output terminals; M sample & holders respectively connected to the output terminals of the demultiplexer and configured to sequentially sample data voltages from the output terminals of the demultiplexer and then simultaneously output the data voltages; and N (N being a positive integer greater than or equal to 2) sub-pixels configured to charge the data voltages sequentially inputted from one of the sample & holders through M data lines in response to a scan pulse.

The display device according to an aspect of the present disclosure may include: a display panel including a plurality of data lines, a plurality of gate lines intersecting the data lines, a plurality of sub-pixels connected to the data lines and the gate lines, a demultiplexer configured to sequentially output a data voltage through M (M being a positive integer greater than or equal to 2) output terminals, and M sample & holders respectively connected to the output terminals of the demultiplexer and configured to sequentially sample data voltages from the output terminals of the demultiplexer and then simultaneously output the data voltages; a drive IC configured to convert pixel data of an input image into the data voltage and supply it to the demultiplexer; and a gate driver configured to sequentially supply a scan pulse to the gate lines. N (N being a positive integer equal to or greater than 2) of the sub-pixels is configured to charge the data voltages sequentially supplied from any one of the sample & holders through M data lines in response to the scan pulse.

The personal immersive system according to an aspect of the present disclosure may include: a first display panel on which a left-eye image is displayed; a second display panel on which a right-eye image is displayed; a first drive IC configured to convert pixel data of the left-eye image into a data voltage and supply it to data lines of the first display panel; a first gate driver configured to sequentially supply a scan pulse to gate lines of the first display panel; a second drive IC configured to convert pixel data of the right-eye image into a data voltage and supply it to data lines of the second display panel; and a second gate driver configured to sequentially supply a scan pulse to gate lines of the second display panel.

Each of the first and second display panels includes: a plurality of data lines; a plurality of gate lines intersecting the data lines; a plurality of sub-pixels connected to the data lines and the gate lines; a demultiplexer configured to sequentially output the data voltage through M (M being a positive integer greater than or equal to 2) output terminals; and M samples & holders respectively connected to the output terminals of the demultiplexer and configured to sequentially sample data voltages from the output terminals of the demultiplexer and simultaneously output the data voltages; and N (N being a positive integer greater than or equal to 2) of the sub-pixels in each of the first and second display panels sequentially charge the data voltages inputted from one of the samples & holders in response to the scan pulse.

In the present disclosure, by using the demultiplexer formed on the display panel, the number of data pads formed on the display panel may be reduced and the pitch between the data pads may be widened. As a result, in a personal immersive display device, drive ICs can be bonded to the data pads without electrical contact failure in a small display panel where a high-resolution pixel array is formed.

Effects which can be achieved by the present disclosure are not limited to the above-mentioned effects. That is, other features that are not mentioned may be obviously understood by those skilled in the art to which the present disclosure pertains from the following description.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
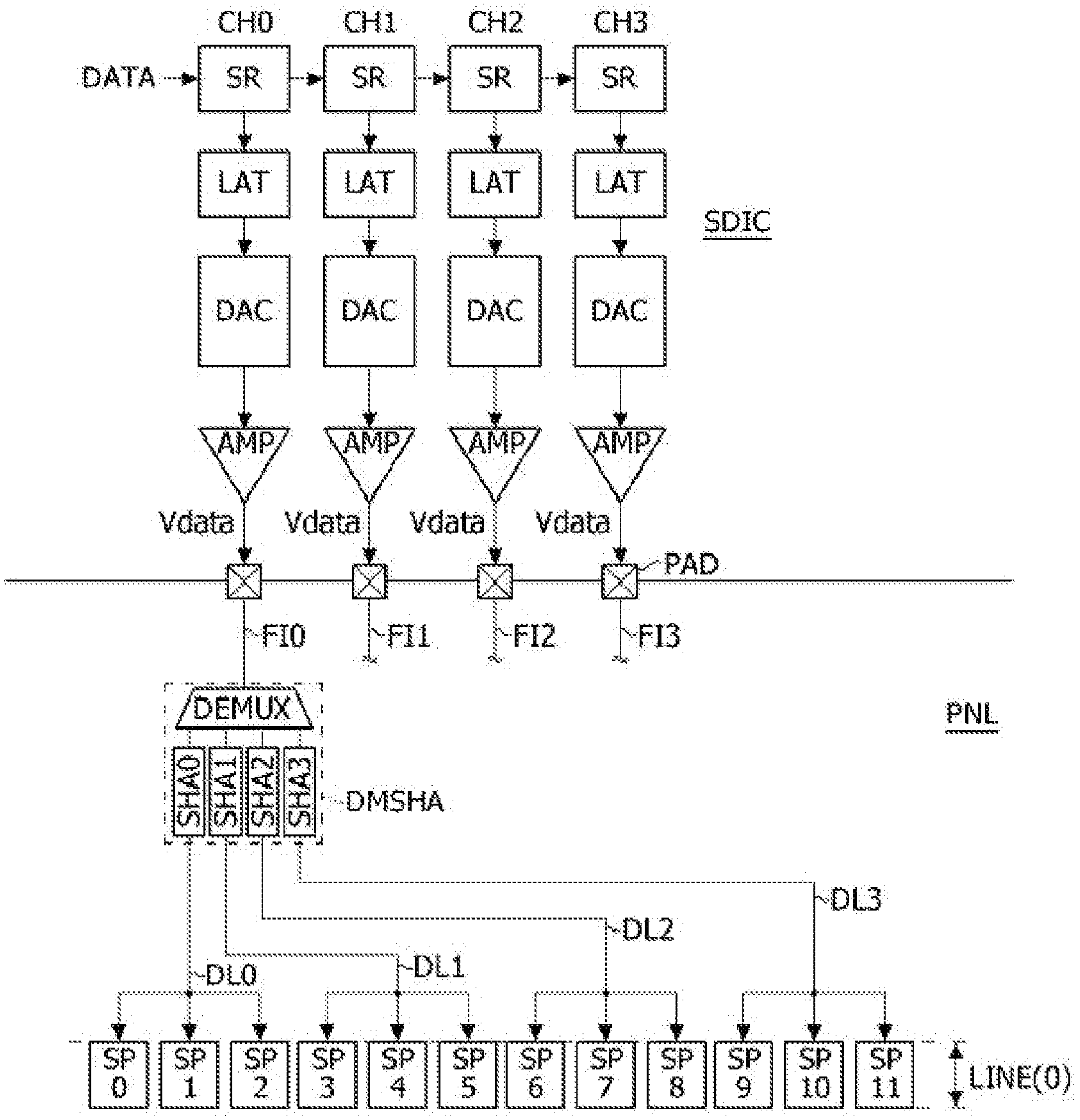
FIG. 1 is a diagram illustrating a connection structure between channels of a source drive IC and pixels of a display panel in a display device according to an aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following aspects can be partially or entirely bonded to or combined with each other and can be linked and operated in technically various ways. The aspects can be carried out independently of or in association with each other.

In a display device of the present disclosure, a pixel circuit and a gate driver may include a plurality of transistors. Transistors may be implemented as a Metal Oxide Field Effect Transistors (MOSFETs), oxide thin film transistors (oxide TFTs) including an oxide semiconductor, low temperature polysilicon (LTPS) TFTs including low temperature polysilicon, or the like on a single crystal silicon wafer. Further, each of the transistors may be implemented as a p-channel TFT or an n-channel TFT. In aspects, descriptions will be given based on an example in which the transistors of the pixel circuit are implemented as the p-channel TFTs, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor. A transistor is turned on in response to a gate-on voltage and is turned off in response to a gate-off voltage. In the case of an n-channel transistor, a gate-on voltage may be a gate high voltage VGH, and a gate-off voltage may be a gate low voltage VGL. In the case of a p-channel transistor, a gate-on voltage may be the gate low voltage VGL, and a gate-off voltage may be the gate high voltage VGH.

Hereinafter, various aspects of the present disclosure will be described in detail with reference to the accompanying drawings.

Figure 2:
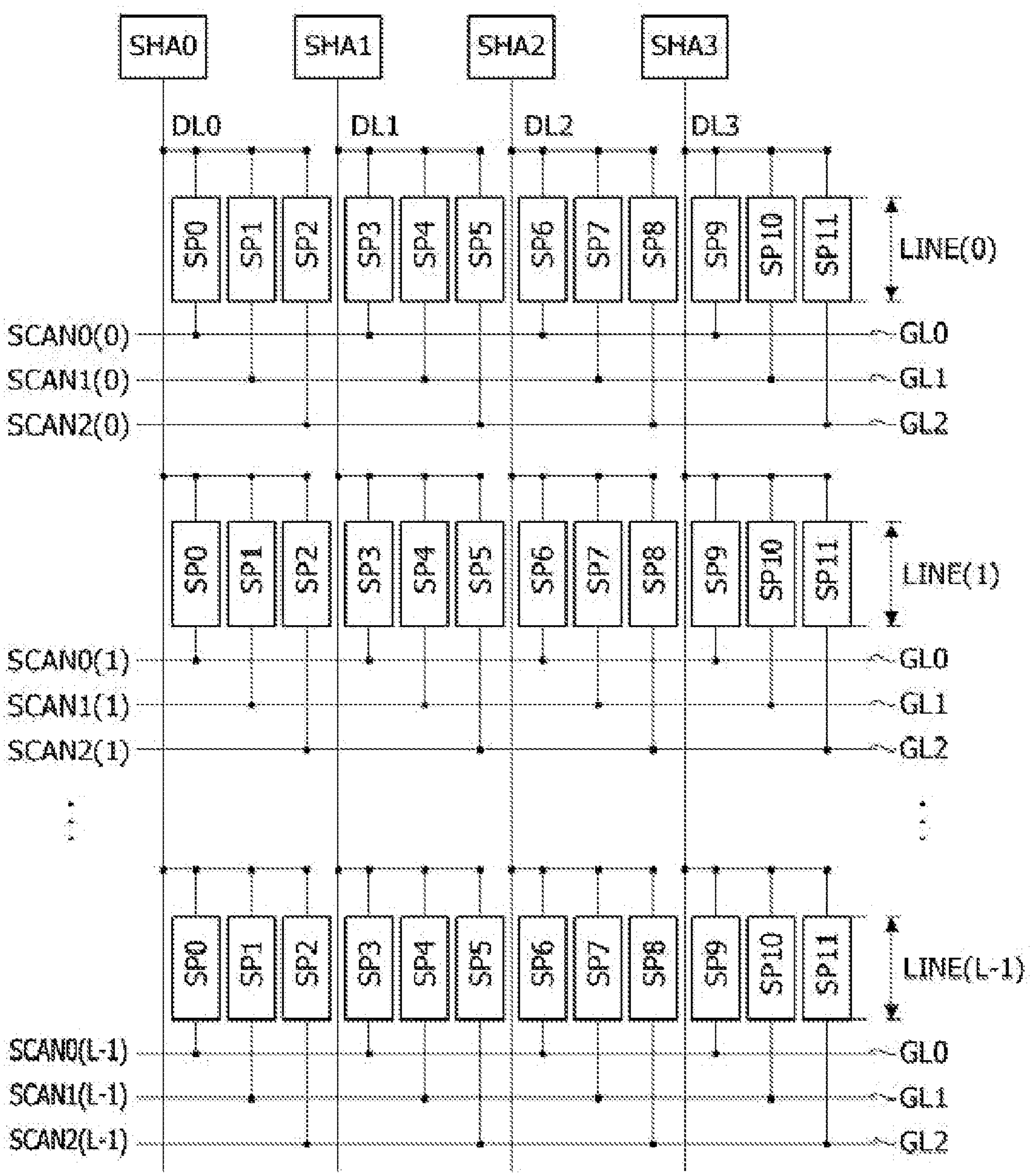
FIG. 2 is a diagram schematically illustrating gate lines and data lines connected to sub-pixels shown in FIG. 1.
Figure 3:
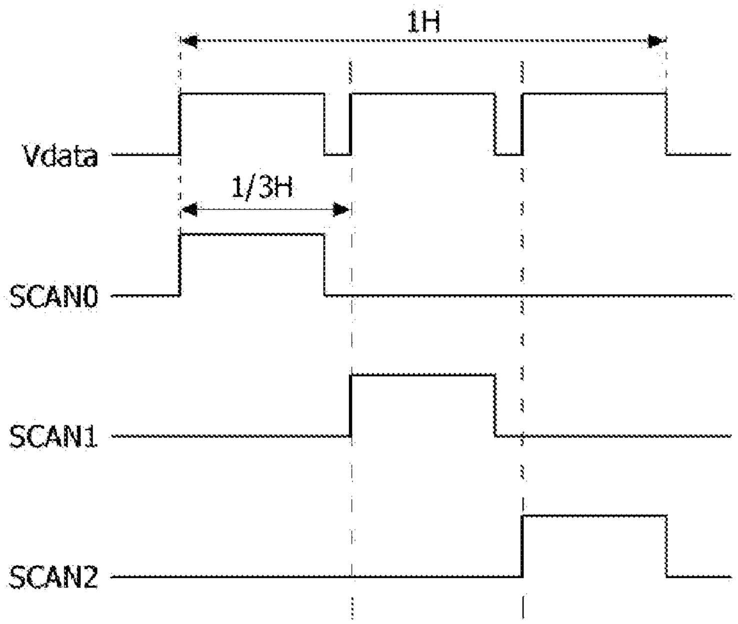
FIG. 3 is a waveform diagram illustrating a data voltage and a scan pulse applied to sub-pixels shown in FIG. 2.

Referring to FIGS. 1 to 3, a display device of the present disclosure includes a display panel PNL on which an input image is displayed, and a source drive IC SDIC that supplies a data voltage to the display panel PNL. Hereinafter, the source drive IC is abbreviated as "drive IC".

The display panel PNL includes a plurality of data lines DL0 to DL3, a plurality of gate lines GL0 to GL2, and pixels connected to the data lines DL0 to DL3 and the gate lines GL0 to GL2 and arranged in a matrix form.

Each of the pixels may include a red (R) sub-pixel, a green (G) sub-pixel, and a blue (B) sub-pixel to reproduce color. Each of the pixels may further include a white (W) sub-pixel. Each of sub-pixels SP0 to SP11 includes a pixel circuit.

The display panel PNL further includes data feeding nodes FI0 to FI3 connected to output terminals of the drive IC SDIC through data pads PAD, and at least one demultiplexing unit DMSHA disposed between the data feeding nodes FI0 to FI3 and the data lines DL0 to DL3. Each of the data lines DL0 to DL3 connected to the output terminals of one demultiplexing unit DMSHA is connected to N (N being a positive integer equal to or greater than 2) adjacent sub-pixels SP0 to SP11 disposed on the same pixel line LINE(0).

When M=4 (M being a positive integer greater than or equal to 2) and N=3, a first data line DL0 is connected to first to third sub-pixels SP0 to SP2, and a second data line DL1 is connected to fourth to sixth sub-pixels SP3 to SP5. A third data line DL2 is connected to seventh to ninth sub-pixels SP6 to SP8, and a fourth data line DL3 is connected to the tenth to twelfth sub-pixels SP9 to SP11.

The drive IC SDIC is bonded to the display panel PNL with an ACF interposed therebetween and is electrically connected to the data pads PAD. Each of the output terminals of the drive IC SDIC is in contact with a corresponding data pad of the display panel PNL to be electrically connected thereto through conductive balls of the ACF.

Channels CH0 to CH3 of the drive IC SDIC convert pixel data DATA of the input image received as a digital signal into a data voltage Vdata. Each of the channels CH0 to CH3 of the drive IC SDIC includes a signal transmission unit SR of a shift register, a latch LAT, a digital-to-analog converter (hereinafter referred to as "DAC"), and an output buffer AMP.

The drive IC SDIC may sequentially output the data voltage Vdata to be applied to M*N (M and N each being a positive integer greater than or equal to 2) sub-pixels SP0 to SP11 arranged in one pixel line LINE(0) for one horizontal period 1H in each of the channels CH0 to CH3. The channels CH0 to CH3 of the drive IC SDIC are one-to-one connected to the data pads on the display panel PNL to be connected to the corresponding data feeding nodes FI0 to FI3.

The shift register of the drive IC SDIC includes signal transmission units SR that sequentially shift the pixel data DATA of the input image. The latch LAT samples the data received from the signal transmission unit SR and outputs the sampled data simultaneously with the latches LAT of the other channels.

The DAC receives the pixel data outputted from the latch LAT and a gamma compensation voltage. The DAC converts the pixel data from the latch LAT into a gamma compensation voltage and outputs the data voltage Vdata corresponding to the grayscale value of the pixel data. The data voltage Vdata outputted from the DAC may be outputted through the output buffer SA.

"M" is the number of output terminals of the demultiplexing unit DMSHA. "N" is the number of sub-pixels SP0 to SP11 that are commonly connected to one output channel of the demultiplexing unit DMSHA and sequentially charged with the data voltage Vdata. In the example of FIG. 1, M is equal to 4, and N is equal to 3. M*N sub-pixels are 4*3=12. The number of data lines DL0 to DL3 for applying the data voltage to M*N sub-pixels is (M*N)/N, i.e., four in the example of FIG. 1.

When M=4 and N=3, one channel of the drive IC SDIC may sequentially output first to twelfth data voltages Vdata to be written to the first to twelfth sub-pixels SP0 to SP11 during one horizontal period 1H.

The demultiplexing unit DMSHA holds M data voltages Vdata sequentially inputted from one channel of the drive IC SDIC and simultaneously outputs them. The demultiplexing unit DMSHA includes one input terminal and M output terminals. The output terminals of the demultiplexing unit DMSHA are connected to the corresponding data lines DL0 to DL3.

The demultiplexing unit DMSHA sequentially samples the data voltages Vdata corresponding to the M*N sub-pixels SP0 to SP11, sequentially inputted from the drive IC SDIC through one input terminal, and simultaneously outputs them to M data lines DL0 to DL3.

For one horizontal period H, the M*N sub-pixels SP0 to SP11 charge the data voltages inputted from the demultiplexing unit DMSHA in response to scan pulses SCAN0 to SCAN2 whose phases are shifted. Accordingly, the number of channels and output terminals of the drive IC SDIC required to drive the M*N sub-pixels SP0 to SP11 arranged in one pixel line LINE(0) may be reduced to 1/(M*N).

The demultiplexing unit DMSHA includes a 1:M demultiplexer DEMUX and M sample & holders SHA0 to SHA3 connected between output terminals of the 1:M demultiplexer DEMUX and the corresponding data lines DL0 to DL3.

A plurality of 1:M demultiplexers DEMUX may be disposed on the display panel PNL. For example, a first 1:M demultiplexer DEMUX may be connected to a first data feeding node FI0, and a second 1:M demultiplexer, which are omitted from the drawing, may be connected to a second data feeding node F11. In this case, the plurality of 1:M demultiplexers are synchronized and each supplies M data voltages sequentially inputted from the drive IC SDIC to the sample & holders SHA0 to SHA3.

The output terminals of the demultiplexing unit DMSHA may be connected to the M*N sub-pixels SP0 to SP11 through the data lines DL0 to DL3.

The 1:M demultiplexer DEMUX includes an input terminal connected to a corresponding data feeding node FI0 to FI3, and M output terminals connected to input terminals of corresponding sample & holders SHA0 to SHA3. The 1:M demultiplexer DEMUX sequentially outputs the data voltage Vdata corresponding to the M*N sub-pixels SP0 to SP11, sequentially received from one channel of the drive IC SDIC, to the M sample & holders SHA0 to SHA3. The 1:M demultiplexer DEMUX sequentially supplies the data voltage Vdata to the M sample & holders SHA0 to SHA3 during a first 1/N horizontal period, and then sequentially supplies the data voltage Vdata to the M sample & holders SHA0 to SHA3 during a second 1/N horizontal period. In addition, the 1:M demultiplexer DEMUX may sequentially supply the data voltage Vdata to the M sample & holders SHA0 to SHA3 during an $N^{th}$ 1/N horizontal period.

The sample & holders SHA0 to SHA3 may sequentially sample the data voltages Vdata inputted from the 1:M demultiplexer DEMUX to capacitors, and simultaneously and sequentially supply the sampled data voltages Vdata to the data lines DL0 to DL3. For example, the sample & holders SHA0 to SHA3 may simultaneously output the first, fourth, seventh, and tenth data voltages Vdata during the first 1/N horizontal period, and simultaneously output the second, fifth, eighth, and eleventh data voltages Vdata during the second 1/N horizontal period, and then, simultaneously output the third, sixth, ninth, and twelfth data voltages Vdata during the $N^{th}$ 1/N horizontal period.

N scan pulses SCAN0 to SCAN2 whose phases are sequentially shifted are applied to the sub-pixels SP0 to SP11 through the gate lines GL0 to GL2. For example, a first scan pulse SCAN0 may be generated as a pulse of a gate-on voltage synchronized with the data voltages Vdata outputted from the sample & holders SHA0 to SHA3 during the first 1/N horizontal period. Subsequently, a second scan pulse SCAN1 may be generated as the pulse of the gate-on voltage synchronized with the data voltages Vdata outputted from the sample & holders SHA0 to SHA3 during the second 1/N horizontal period. Next, an $N^{th}$ scan pulse may be generated as the pulse of the gate-on voltage synchronized with the data voltages Vdata outputted from the sample & holders SHA0 to SHA3 during the $N^{th}$ 1/N horizontal period.

When M=4 and N=3, the first to third scan pulses SCAN0 to SCAN2 may be sequentially generated for one horizontal period 1H. The first scan pulse SCAN0 may be applied to four sub-pixels SP0, SP3, SP6, and SP9 in synchronization with the data voltages outputted from the sample & holders SHA0 to SHA3 during a first ⅓ horizontal period 1/3H. The second scan pulse SCAN1 may be applied to four sub-pixels SP1, SP4, SP7, and SP10 in synchronization with the data voltages outputted from the sample & holders SHA0 to SHA3 during a second ⅓ horizontal period 1/3H. The third scan pulse SCAN2 may be applied to four sub-pixels SP2, SP5, SP8, and SP11 in synchronization with the data voltages outputted from the sample & holders SHA0 to SHA3 during a third ⅓ horizontal period 1/3H.

A gate driver shifts the scan pulses in the order of the first scan pulse SCAN0, the second scan pulse SCAN1, and the third scan pulse SCAN2 during one horizontal period 1H using the shift register. In addition, the gate driver shifts the scan pulses SCAN0 to SCAN2 every horizontal period. In FIG. 2, "SCAN0(0) to SCAN2(0)" are scan pulses applied to a first pixel line LINE(0). "SCAN0(1) to SCAN2(1)" are scan pulses applied to a second pixel line LINE(1). "SCAN0 (L-1) to SCAN2(L-1)" are scan pulses applied to an $L^{th}$ pixel line LINE(L-1).

During one horizontal period 1H, the first to third data voltages Vdata sequentially outputted from a first sample & holder SHA0 may be sequentially charged to the first to third sub-pixels SP0 to SP2 through the corresponding data line DL0. During one horizontal period 1H, the fourth to sixth data voltages Vdata sequentially outputted from a second sample & holder SHA1 may be sequentially charged to the fourth to sixth sub-pixels SP3 to SP5 through the corresponding data line DL1. During one horizontal period 1H, the seventh to ninth data voltages Vdata sequentially outputted from a third sample & holder SHA2 may be sequentially charged to the seventh to ninth sub-pixels SP6 to SP8 through the corresponding data line DL2. During one horizontal period 1H, the tenth to twelfth data voltages Vdata sequentially outputted from a fourth sample & holder SHA3 may be sequentially charged to the tenth to twelfth sub-pixels SP9 to SP11 through the corresponding data line DL3.

The drive IC SDIC outputs M*N pixel data per channel and transmit it to the display panel PNL for one horizontal period 1H, and the demultiplexing unit DMSHA on the display panel PNL demultiplexes the data voltage from the drive IC SDIC. The M*N pixel data outputted from one channel of the drive IC SDIC may be sequentially written to the M*N sub-pixels SP0 to SP11.

In the example of FIGS. 1 to 3, the demultiplexing unit DMSHA demultiplexes the data voltage Vdata by 1:4 (M=4), and the sub-pixels demultiplexes each of the data voltages Vdata sequentially inputted from the demultiplexing unit DMSHA by 1:3 (N=3). As a result, since the data voltage Vdata outputted from the drive IC SDIC is demultiplexed by 1:12 to be charge to the sub-pixels SP0 to SP11, the number of channels of the drive IC SDIC may be reduced to 1/12, and thus the number of data pads PAD disposed on the display panel PNL may be reduced by that amount. Accordingly, a pitch between the data pads PAD disposed in a limited pad region of the display panel PNL may be increased.

When the number of data output terminals of the drive IC SDIC and the number of data pads PAD of the display panel PNL are reduced to 1/M*N, the pitch between the data pads PAD in a high-resolution display panel PNL may be increased. When the pitch between the data pads PAD is sufficiently secured, in a bonding process between the drive IC SDIC and the display panel PNL, the output terminals of the drive IC SDIC and the data pads PAD of the display panel PNL may be bonded to each other without electrical contact failure.

A backplane of the display panel PNL may be manufactured based on a silicon wafer. The backplane may be interpreted as a substrate. In the case of a silicon backplane used in a virtual reality (VR) system, the size of the display panel PNL that can be manufactured in one shot in a current exposure process is up to 32×24 $mm^2$. A circuit layer of the silicon backplane may include a circuit layer in which a demultiplexer, sample & holders, and a pixel circuit are disposed. Due to the demultiplexing unit DMSHA disposed on the display panel PNL, a pitch between the data pads connected to data lines of a high resolution pixel array may be increased.

The sub-pixels SP0 to SP11 connected to one sample & holder SHA0 to SHA3 may be sub-pixels of the same color or sub-pixels of different colors. For example, R, G, and B sub-pixels may be connected to the first sample & holder SHA0, or R sub-pixels of adjacent pixels may be connected thereto. R, G, and B sub-pixels of another pixel or G sub-pixels of adjacent pixels may be connected to the second sample & holder SHA1. R, G, and B sub-pixels of still another pixel or B sub-pixels of adjacent pixels may be connected to the third sample & holder SHA2. Since the difference in the data voltage Vdata applied to adjacent sub-pixels of the same color is small, it is possible to reduce the data voltage charging delay of the sub-pixels connected to one sample & holder SHA0 to SHA3.

Figure 4:
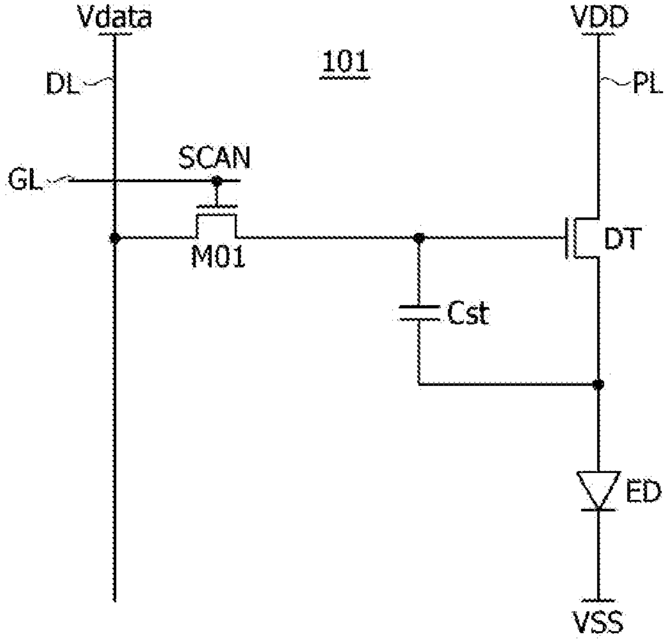
FIGS. 4 to 6 are circuit diagrams illustrating pixel circuits according to an aspect of the present disclosure.
Figure 5:
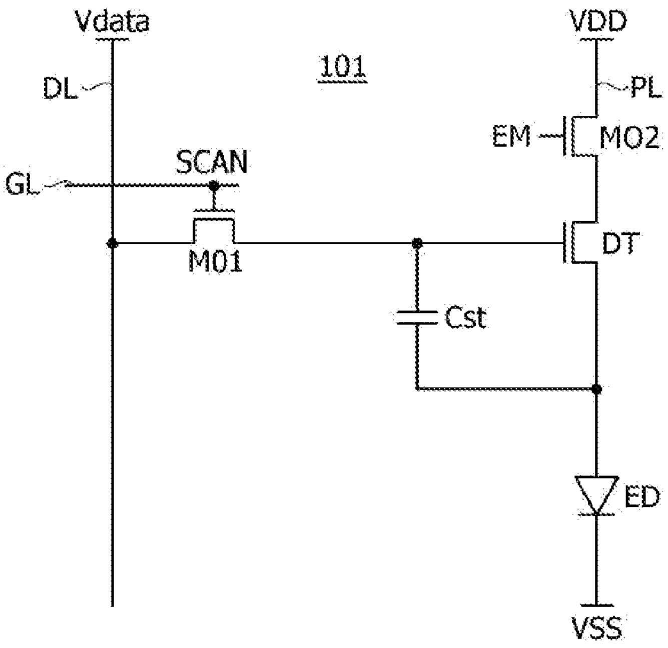
Figure 6:
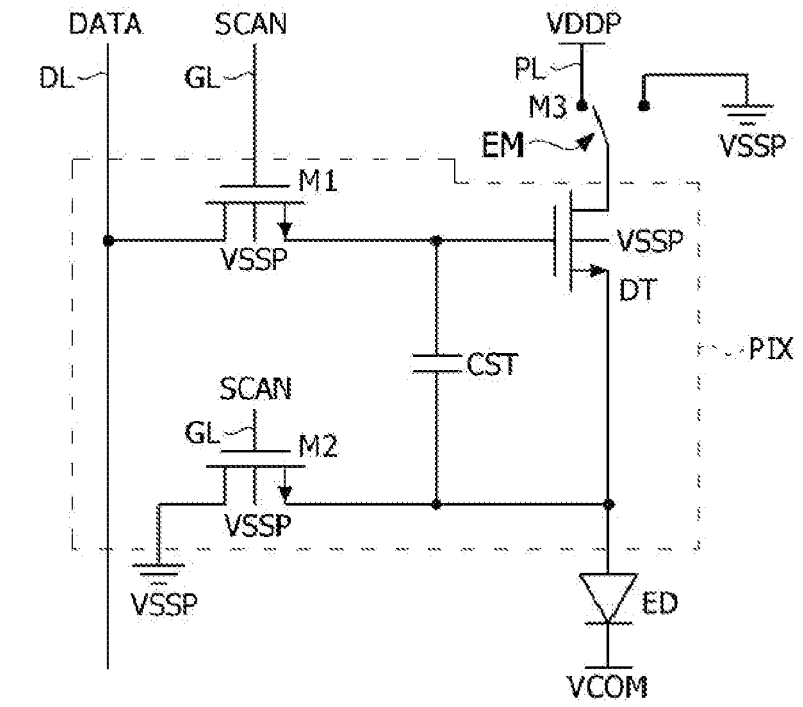

The pixel circuit formed in each of the sub-pixels may be implemented with a circuit shown in FIGS. 4 to 6, but is not limited thereto.

Referring to FIG. 4, the pixel circuit includes a light emitting element ED, a driving element DT for supplying a current to the light emitting element ED, a switch element M01 that connects a data line DL to the gate of the driving element DT in response to a scan pulse SCAN, and a capacitor Cst connected between the gate of the driving element DT and the second electrode of the driving element DT. Each of the driving element DT and the switch element M01 may be implemented with a transistor.

A pixel driving voltage VDD is applied to the first electrode of the driving element DT through a power line PL. In response to the gate-on voltage of the scan pulse SCAN applied through a gate line GL, the switch element M01 is turned on to supply the data voltage Vdata from the data line DL to the gate of driving element DT and the capacitor Cst. The driving element DT drives the light emitting element ED by supplying a current to the light emitting element ED according to a gate-source voltage Vgs.

The anode of the light emitting element ED is connected to the second electrode of the driving element DT, and the cathode thereof is connected to a low potential voltage source VSS. The light emitting element ED is turned on and emits light when the forward voltage between the anode and the cathode is equal to or greater than a threshold voltage. The capacitor Cst is connected between the gate and the second electrode of the driving element DT to maintain the gate-source voltage Vgs of the driving element DT.

As shown in FIG. 5, the pixel circuit may further include a second switch element M02. The second switch element M02 switches a current path between the pixel driving voltage VDD and the light emitting element ED in response to an emission control signal EM. When the light emitting element ED is driven, the second switch element M02 is turned on in response to the gate-on voltage of the emission control signal EM to form the current path between the pixel driving voltage VDD and the light emitting element ED.

A back plane of the display panel PNL may be manufactured based on a silicon wafer. Hereinafter, a backplane manufactured from a silicon wafer is referred to as a "silicon backplane". Transistors incorporated in a pixel circuit formed in a circuit layer on the silicon backplane may, as shown in FIG. 6, be implemented with a 4-electrode MOSFET including source, drain, gate, and body electrodes.

Referring to FIG. 6, the pixel circuit includes the light emitting element ED, the driving element DT for supplying a current to the light emitting element ED, a first switch element M1 that connects the data line DL to the gate of the driving element DT in response to the scan pulse SCAN, a second switch element M2 connected to the anode of the light emitting element ED and a low potential voltage source VSSP in response to the scan pulse SCAN, and the capacitor Cst connected between the gate of the driving element DT and the second electrode of the driving element DT. A third switch element M3 is disposed outside a screen AA on the display panel PNL and switches a pixel driving voltage VDDP applied to one pixel line in response to the emission control signal EM.

Each of the driving element DT and the switch elements M1, M2, and M3 may be implemented with a MOSFET. The low potential voltage source VSSP may be connected to the body electrode of the MOSFET.

The pixel driving voltage VDDP is applied to the first electrode of the driving element DT. The anode of the light emitting element ED is connected to the second electrode of the driving element DT, the capacitor Cst, and the second electrode of the second switch element M2. The cathode of the light emitting element ED is connected to a low potential voltage source VCOM.

The second switch element M2 may include a gate to which the scan pulse SCAN is applied, a first electrode connected to the low potential voltage source VSSP or a sensing circuit omitted from the drawing, and a second electrode connected to the anode of the light emitting element ED. A voltage of 0 V may be applied to the second electrode of the driving element DT, and the data voltage Vdata may be applied to the gate of the driving element DT. A current flowing through the light emitting element ED is determined according to the gate-source voltage Vgs of the driving element DT. Meanwhile, in a test process, the second switch element M2 may be turned on when sensing the electrical characteristics of the driving element DT or the light emitting element ED to connect the pixel circuit to the sensing circuit.

When the light emitting element ED is driven, the third switch element M3 is turned on in response to the gate-on voltage of the emission control signal EM to apply the pixel driving voltage VDDP to the sub-pixels SP0 to SP11 of one pixel line. When the light emitting element ED is not driven, the third switch element M3 may discharge the anode of the light emitting element ED by connecting the anode of the light emitting element ED to the low potential voltage source VSSP.

Figure 7A:
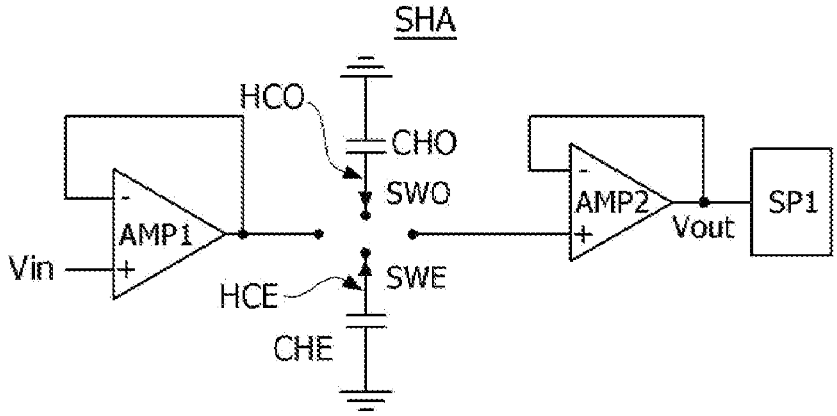
FIGS. 7A to 7C are circuit diagrams illustrating a sample & holder in detail according to an aspect of the present disclosure.
Figure 7B:
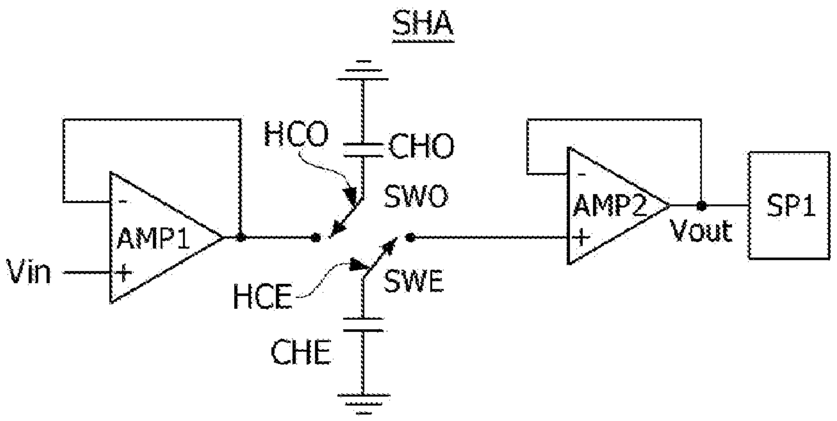
Figure 7C:
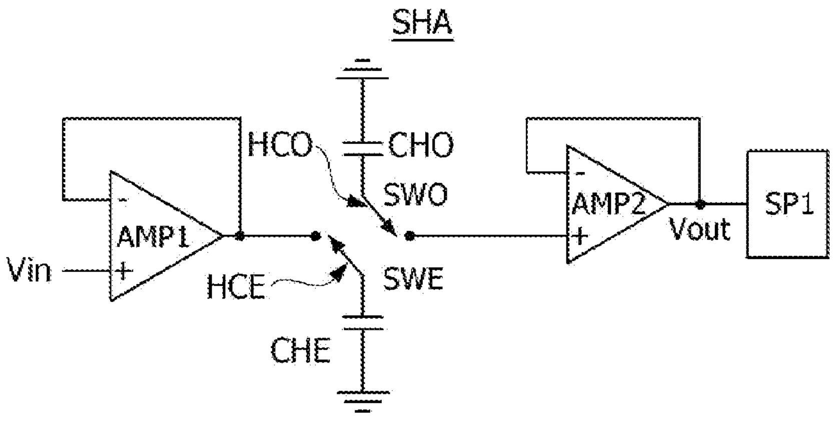

Each of the sample & holders SHA0 to SHA3 may be implemented with a double buffering circuit as shown in FIGS. 7A to 7C. Each of the sample & holders SHA0 to SHA3 may receive an input data voltage Vdata from the demultiplexer DEMUX, simultaneously sample the input data voltage Vdata and output a previously sampled data voltage Vdata to the data line DL0 to DL3, using two capacitors and switch elements. Accordingly, each of the samples & holders SHA0 to SHA3 may simultaneously perform sampling of an input signal and output of a previously sampled signal.

FIGS. 7A to 7C are circuit diagrams showing details of a sample & holder SHA according to an aspect of the present disclosure.

Referring to FIGS. 7A to 7C, the sample & holder SHA may include an input buffer AMP1, a first capacitor CHO, a second capacitor CHE, a first switch element SWO, a second switch element SWE, and an output buffer AMP2.

The first capacitor CH0 may be connected between the first switch element SW0 and a ground voltage source GND. The second capacitor CHE may be connected between the second switch element SWE and the ground voltage source GND.

An input signal Vin to the sample & holder SHA may be the data voltage input through the demultiplexer DEMUX. An output voltage Vout from the sample & holder SHA is the data voltage Vdata to be charged into the sub-pixels SP0 to SP11 after being held by the capacitors CHO and CHE.

Each of the input and output buffers AMP1 and AMP2 may be implemented with an operational amplifier (OP AMP). The inverting input terminal (−) of the input buffer AMP1 is connected to the output terminal thereof. The input signal Vin is applied to the non-inverting input terminal (+) of the input buffer AMP1. The output terminal of the input buffer AMP1 is connected to the first and second switch elements SWO and SWE.

The inverting input terminal (−) of the output buffer AMP2 is connected to the output terminal thereof. The switch elements SW0 and SWE are connected to the non-inverting input terminal (+) of the output buffer AMP2. The output terminal of the output buffer AMP2 is connected to the data line DL0 to DL3.

The first and second switch elements SWO and SWE may be alternately connected to the output terminal of the input buffer AMP1 and the input terminal of the output buffer AMP2.

Figure 13:
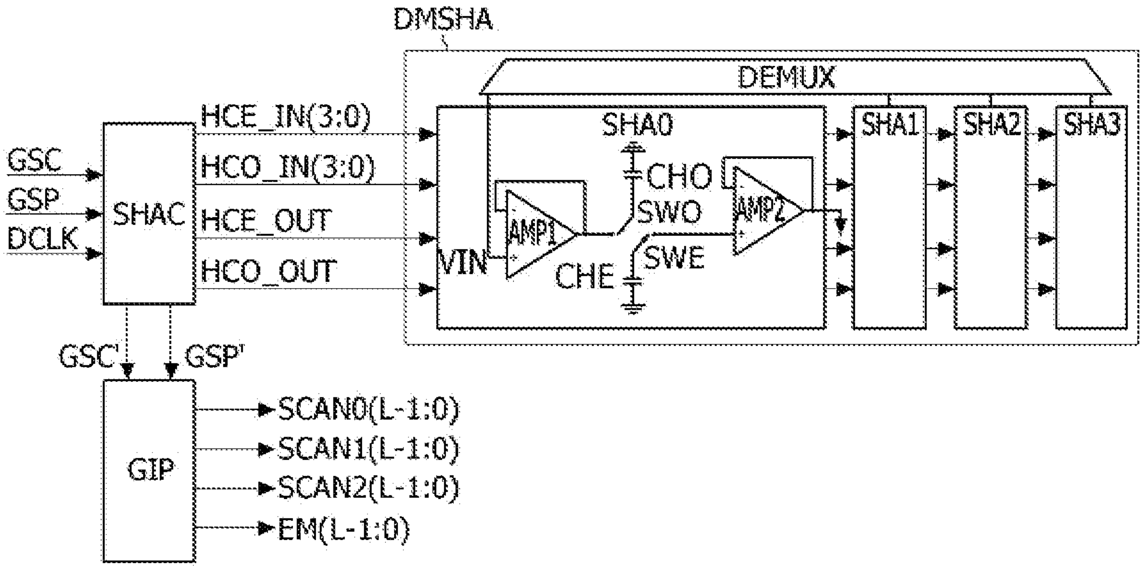
FIG. 13 is a diagram illustrating a demultiplexing unit, a second controller, and a gate driver.

As shown in FIG. 13, the first switch element SWO receives a 1-bit control signal HCO_IN defining a data input timing and a 1-bit control signal HCO_OUT defining a data output timing. In the plurality of sample & holders SHA0 to SHA3 connected to one 1:M demultiplexer DEMUX, the control signal HCO_IN may be individually inputted to each of the sample & holders SHA0 to SHA3 so that the sample & holders SHA0 to SHA3 can sequentially sample the input voltage Vin. The control signal HCO_OUT may be commonly inputted to the sample & holders SHA0 to SHA3 so that the output voltage Vout is simultaneously generated from the sample & holders SHA0 to SHA3. The first capacitor CH0 may be connected to the sub-pixels SP0 to SP11 through the first switch element SWO and the data lines DL0 to DL3 in a cycle of two horizontal periods 2H.

The first switch element SWO includes a first terminal connected to the output terminal of the input buffer AMP1, a second terminal connected to the first capacitor CHO, a third terminal connected to the non-inverting input terminal (+) of the output buffer AMP2, and a control terminal to which the control signals HCO_IN and HCO_OUT are applied.

The input/output timing of the first switch element SWO may be alternated with that of the second switch element SWE. The first switch element SWO may supply the data voltage Vdata to the first capacitor CHO and may supply a voltage held by the first capacitor CHO to the output buffer AMP2. The first switch element SWO may connect the first capacitor CHO to a floating node to which no voltage is applied or the ground voltage source GND in response to the control signals HCO_IN and HCO_OUT.

The first switch element SWO may operate as shown in Table 1 below according to the logic values of the control signals HCO_IN and HCO_OUT.

TABLE 1

| HCO_OUT | HCO_IN | Function |
|---|---|---|
| 0 | 0 | Float |
| 0 | 1 | Input |
| 1 | 0 | Output |
| 1 | 1 | Not available |

When the control signal HCO_OUT=0 and the control signal HCO_IN=0, as shown in FIG. 7A, the first switch element SWO may connect the first capacitor CHO to the floating node. When the control signal HCO_OUT=0 and the control signal HCO_IN=1, as shown in FIG. 7B, the first switch element SWO connects the first capacitor CH0 to the output terminal of the input buffer AMP1. In this case, the data voltage Vdata is charged in the first capacitor CHO. When the control signal HCO_OUT=1 and the control signal HCO_IN=0, as shown in FIG. 7C, the first switch element SWO connects the first capacitor CHO to the non-inverting input terminal (+) of the output buffer AMP2. In this case, the voltage charged in the first capacitor CHO, i.e., the held data voltage Vdata is supplied to the data line DL0 to DL3 through the output buffer AMP2.

When the control signal HCO_IN=1 and the control signal HCO_OUT=1, the first switch element SWO may have an undefined function, maintain a previous state, or connect the first capacitor CHO to the ground voltage source GND to reset the first capacitor CHO.

As shown in FIG. 13, the second switch element SWE receives a 1-bit control signal HCE_IN defining a data input timing and a 1-bit control signal HCE_OUT defining a data output timing. In the plurality of sample & holders SHA0 to SHA3 connected to one 1:M demultiplexer DEMUX, the control signal HCE_IN may be individually inputted to each of the sample & holders SHA0 to SHA3 so that the sample & holders SHA0 to SHA3 can sequentially sample the input voltage. The control signal HCE_OUT may be commonly inputted to the sample & holders SHA0 to SHA3 so that the output voltage Vout is simultaneously generated from the sample & holders SHA0 to SHA3. The second capacitor CHE may be connected to the sub-pixels SP0 to SP11 through the second switch element SWE and the data lines DL0 to DL3 in a cycle of two horizontal periods 2H.

The second switch element SWE includes a first terminal connected to the output terminal of the input buffer AMP1, a second terminal connected to the second capacitor CHE, a third terminal connected to the non-inverting input terminal (+) of the output buffer AMP2, and a control terminal to which the control signals HCE_IN and HCE_OUT are applied.

The second switch element SWE may supply the data voltage Vdata to the second capacitor CHE, and supply a voltage held by the second capacitor CHE to the output buffer AMP2. The second switch element SWE may connect the second capacitor CHE to the floating node to which no voltage is applied or the ground voltage source GND in response to the control signals HCE_IN and HCE_OUT.

The second switch element SWE may operate as shown in Table 2 below according to the logic values of the 2-bit control signals HCE_IN and HCE_OUT.

TABLE 2

| HCE_OUT | HCE_IN | Function |
|---|---|---|
| 0 | 0 | Float |
| 0 | 1 | Input |
| 1 | 0 | Output |
| 1 | 1 | Not available |

When the control signal HCE_OUT=0 and the control signal HCE_IN=0, as shown in FIG. 7A, the second switch element SWE may connect the second capacitor CHE to the floating node. When the control signal HCE_OUT=0 and the control signal HCE_IN=1, as shown in FIG. 7C, the second switch element SWE connects the second capacitor CHE to the output terminal of the input buffer AMP1. In this case, the data voltage Vdata is charged in the second capacitor CHE. When the control signal HCE_OUT=1 and the control signal HCE_IN=0, as shown in FIG. 7B, the second switch element SWE connects the second capacitor CHE to the non-inverting input terminal (+) of the output buffer AMP2. In this case, the voltage charged in the second capacitor CHE, i.e., the held data voltage Vdata is supplied to the data line DL0 to DL3 through the output buffer AMP2.

When the control signal HCE_IN=1 and the control signal HCE_OUT=1, the second switch element SWE may have an undefined function, maintain a previous state, or connect the second capacitor CHE to the ground voltage source GND to reset the second capacitor CHE.

Figure 8:
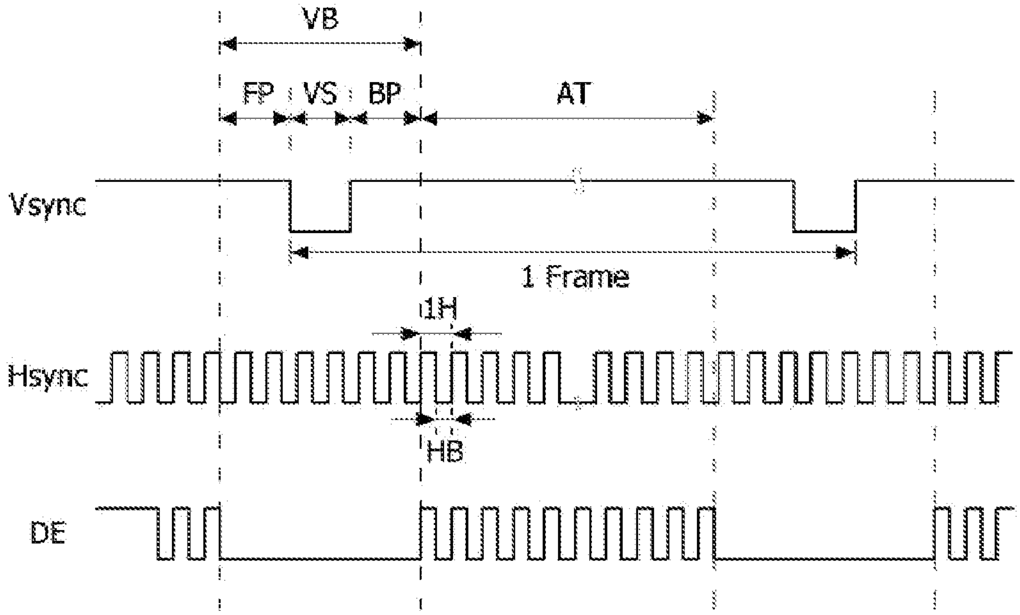
FIG. 8 is a diagram illustrating a driving timing of a display device.

FIG. 8 is a diagram illustrating a driving timing of a display device.

Referring to FIG. 8, one frame period is divided into an active interval AT in which the pixel data of the input image is received by a display driver, and a vertical blank period VB in which the pixel data is not received by the display driver.

A vertical synchronization signal Vsync defines one frame period. One pulse period of a horizontal synchronization signal Hsync and a data enable signal DE is one horizontal period 1H. The display driver writes the pixel data to the sub-pixels arranged in one pixel line of the display panel for one horizontal period. The data enable signal DE defines an effective data period including pixel data to be written to the pixels. The pulse of the data enable signal DE is synchronized with pixel data to be written to the pixels of the display panel 100.

A horizontal blank period HB is a period in which there is no pixel data within one horizontal period. The horizontal blank period HB exists between one-line data to be written to the sub-pixels of an $I^{th}$ (I being a positive integer) pixel line and one-line data to be written to the sub-pixels of an $(I+1)^{th}$ pixel line.

Figure 9:
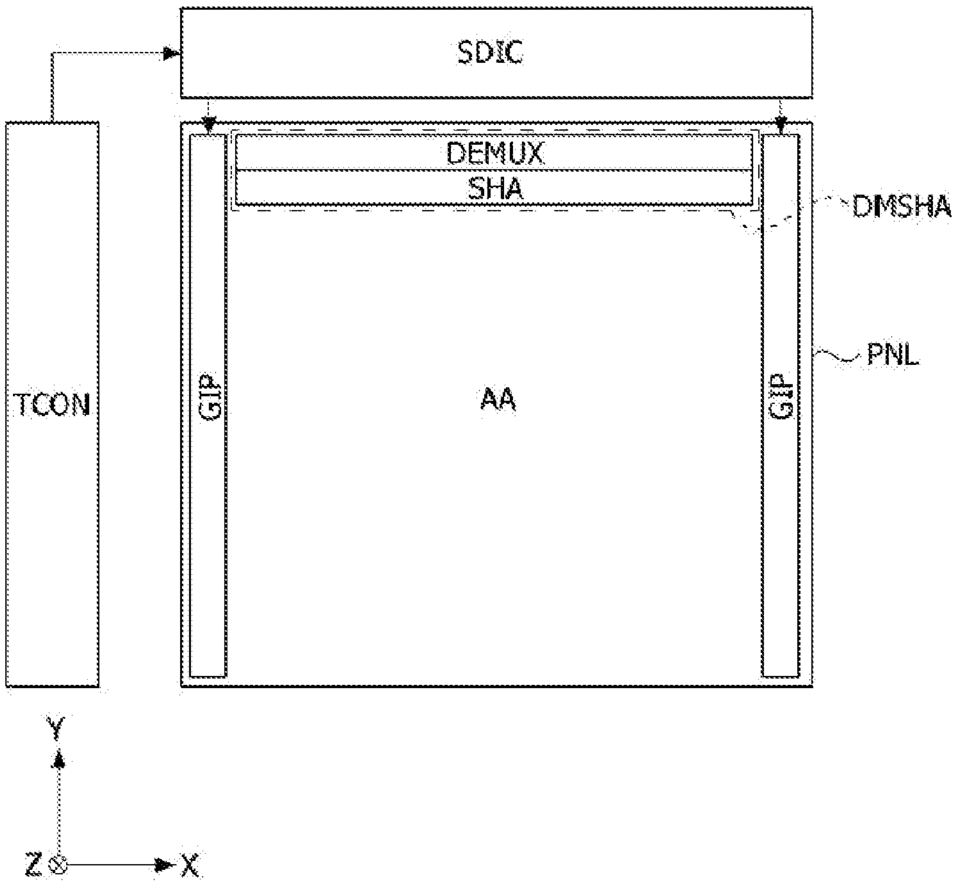
FIG. 9 is a diagram schematically illustrating a display panel and a display driver according to an aspect of the present disclosure.

FIG. 9 is a diagram schematically illustrating a display panel and a display driver according to an aspect of the present disclosure.

Referring to FIG. 9, the display device of the present disclosure includes the display panel PNL and the display driver for writing the pixel data of the input image to the pixels of the display panel PNL.

The display panel PNL has a length X, a width Y, and a thickness Z, and has a structure in which a circuit layer and a light emitting element layer are stacked on a backplane manufactured based on a glass, plastic, or silicon wafer. The screen AA of the display panel PNL includes the pixels arranged in a matrix form defined by the data lines and the gate lines which intersect each other.

Each of the pixels may include an R sub-pixel, a G sub-pixel, and a B sub-pixel for color reproduction, and may further include a W sub-pixel. Each of the sub-pixels includes a pixel circuit formed on the circuit layer to drive the light emitting element ED.

The display driver includes the drive IC SDIC having a data driver for driving the data lines, a gate driver GIP for driving the gate lines, and a timing controller TCON for controlling the drive IC SDIC and the gate driver GIP.

Figure 10:
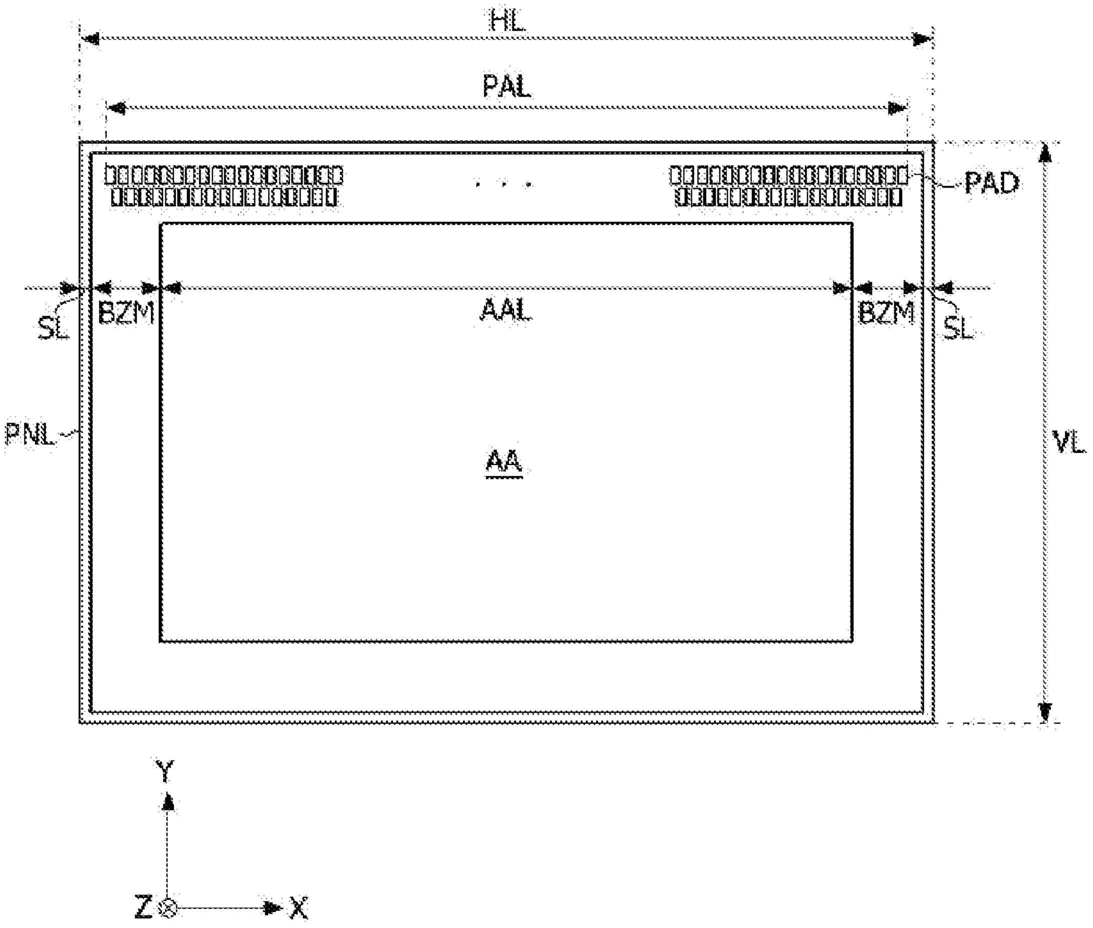
FIG. 10 is a diagram illustrating a data pad region and a screen of a display panel manufactured based on a silicon backplane.

The drive IC SDIC receives the pixel data DATA of the input image from the timing controller TCON, converts the pixel data DATA into the data voltage Vdata, and supplies it to the data lines. The data output terminals of the drive IC SDIC are bonded to a pad region PAL of the display panel PNL shown in FIG. 10 with the ACF interposed therebetween. As shown in FIG. 10, the pad region PAL of the display panel PNL includes the data pads PAD electrically connected to the data output terminals of the drive IC SDIC.

The display panel PNL includes the demultiplexing unit DMSHA disposed between the pad region PAL shown in FIG. 10 and the screen AA. The demultiplexing unit DMSHA includes the 1:M demultiplexer DEMUX connected to the data pads PAD of the pad region PAL, and the sample & holders SHA0 to SHA3 disposed between the output terminals of the 1:M demultiplexer DEMUX and the data lines DL0 to DL3.

When the screen resolution of the display panel PNL is K*L (K and L each being a positive integer greater than or equal to 2), the required number of the data pads is (3*K)/(M*N). Here, a value 3*K is obtained by multiplying the horizontal resolution by the number of sub-pixels when one pixel includes three sub-pixels, e.g., RGB sub-pixels. When the vertical resolution of the screen is L, that is, when L pixel lines LINE(0) to LINE(L-1) are arranged on the screen AA, signals SCAN0(L-1:0), SCAN1(L-1:0), SCAN2(L-1:0), and EM(L-1:0) shown in FIGS. 12 and 13 indicate gate signals generated from the gate driver GIP. These gate signals SCAN0(L-1:0), SCAN1(L-1:0), SCAN2(L-1:0), and EM(L-1:0) are sequentially applied to the first to $L^{th}$ pixel lines LINE(0) to LINE(L-1) through the gate lines GL0 to GL2 connected to the sub-pixels SP0 to SP11 of each pixel line LINE(0) to LINE(L-1). The display driver may write the pixel data to the sub-pixels of the pixel lines LINE(0) to LINE(L-1) by one pixel line for every horizontal period in a progressive scan or interlace scan method.

Each of the pixel lines LINE(0) to LINE(L-1) charges the data voltage outputted from the corresponding sample & holder SHA while operating as a 1:N demultiplexer in response to the scan pulses SCAN0 to SCAN2 sequentially generated from the gate driver GIP.

The gate driver GIP may be formed on the circuit layer of the display panel PNL together with the pixel array of the screen AA. The gate driver GIP may be disposed on each of the left and right bezels of the display panel PNL to supply a gate signal to the gate lines GL0 to GL2 in a double feeding method. In the double feeding method, under the control of the timing controller TCON, the gate drivers GIP on both sides separated with the pixel array of the screen AA interposed therebetween may be synchronized so that the gate signal may be simultaneously applied to both ends of one gate line. In another aspect, the gate driver GIP may be disposed on any one of the left and right bezels of the display panel PNL to supply a gate signal to the gate lines GL0 to GL2 in a single feeding method. The gate driver GIP may shift the gate signal using the shift register under the control of the timing controller TCON. The gate signal may include the scan pulses SCAN0 to SCAN2 and the emission control signal EM. At least some of wires and circuit elements, e.g., a transistor and a capacitor, constituting the gate driver GIP may be distributedly disposed within the pixel array of the screen AA, so that the size of the bezel may be reduced.

As shown in FIG. 10, the display panel PNL may include the pad region PAL, a bezel margin region BZM, and a scribe lane region SL disposed outside the screen AA. The gate driver and wires connected to the gate driver may be formed in the bezel margin region BZM, and a dummy pixel or a sensor may be additionally disposed therein.

In the virtual reality (VR) system, a display panel for the left eye and a display panel for the right eye may each be manufactured based on a silicon backplane. In this case, a horizontal length HL of the display panel PNL may be 32,000 μm, and a vertical length (or width) VL thereof may be 24,000 μm. Here, when it is secured that each of the left and right widths of the bezel margin region BZM is 1,300 μm and each of the left and right widths of the scribe lane SL is 400 μm and further, each of the left and right widths of a sealing is 10 μm and a die edge rule is 6 μm, the length of the pad region PAL is 31,168 μm. The die edge rule is a process margin region between the sealing and the pad region PAL. In such a display panel PNL, when the pixel resolution of the screen is 3000*2400, if 3000 data pads PAD are formed in the pad region PAL, the pitch between the data pads PAD is as narrow as 10 μm. Therefore, electrical defects such as a short circuit may occur in the bonding process between the drive IC SDIC and the display panel PNL.

In the present disclosure, by forming the demultiplexing unit DMSHA on the display panel PNL to correspond to each channel of the drive IC SDIC, the number of data pads PAD required in a high-resolution pixel array may be reduced to 1/(M*N), thereby securing a sufficiently wide pitch between the data pads PAD. As described above, the demultiplexing unit DMSHA samples and holds the data voltages sequentially outputted from the drive IC SDIC using the demultiplexer DEMUX and the sample & holders SHA0 to SHA3, and then sequentially applies them to the pixels.

Figure 11:
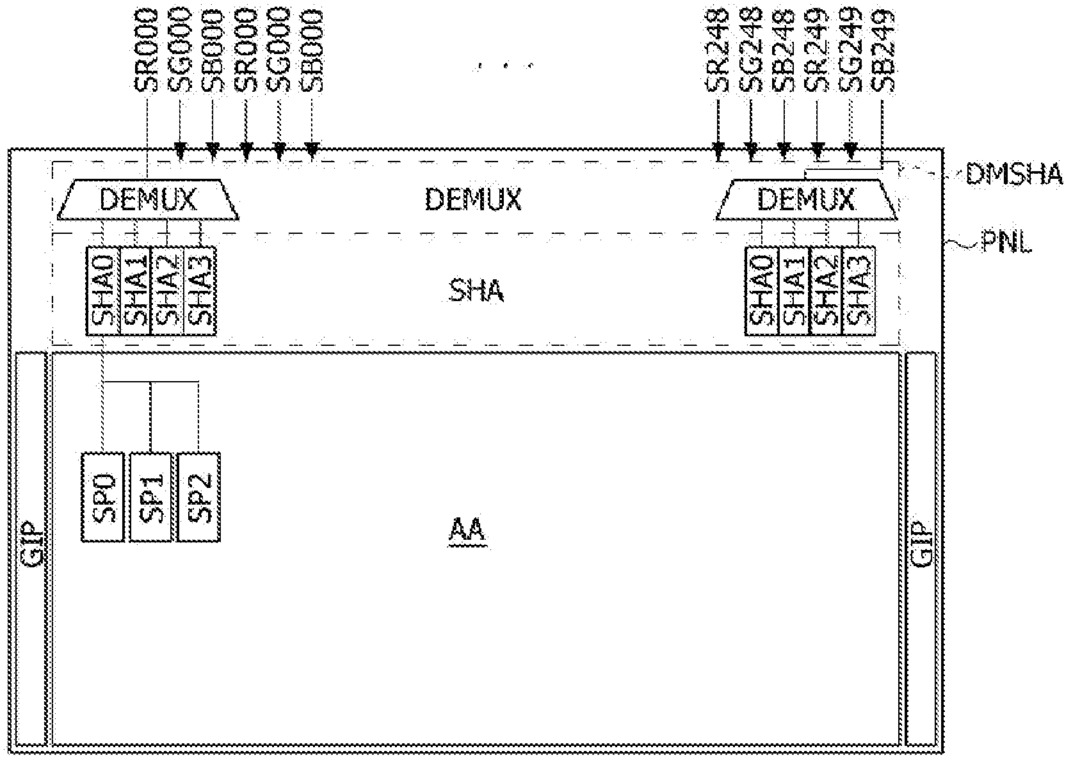
FIG. 11 is a diagram schematically illustrating a structure of a display panel and an input signal of the display panel according to an aspect of the present disclosure.
Figure 12:
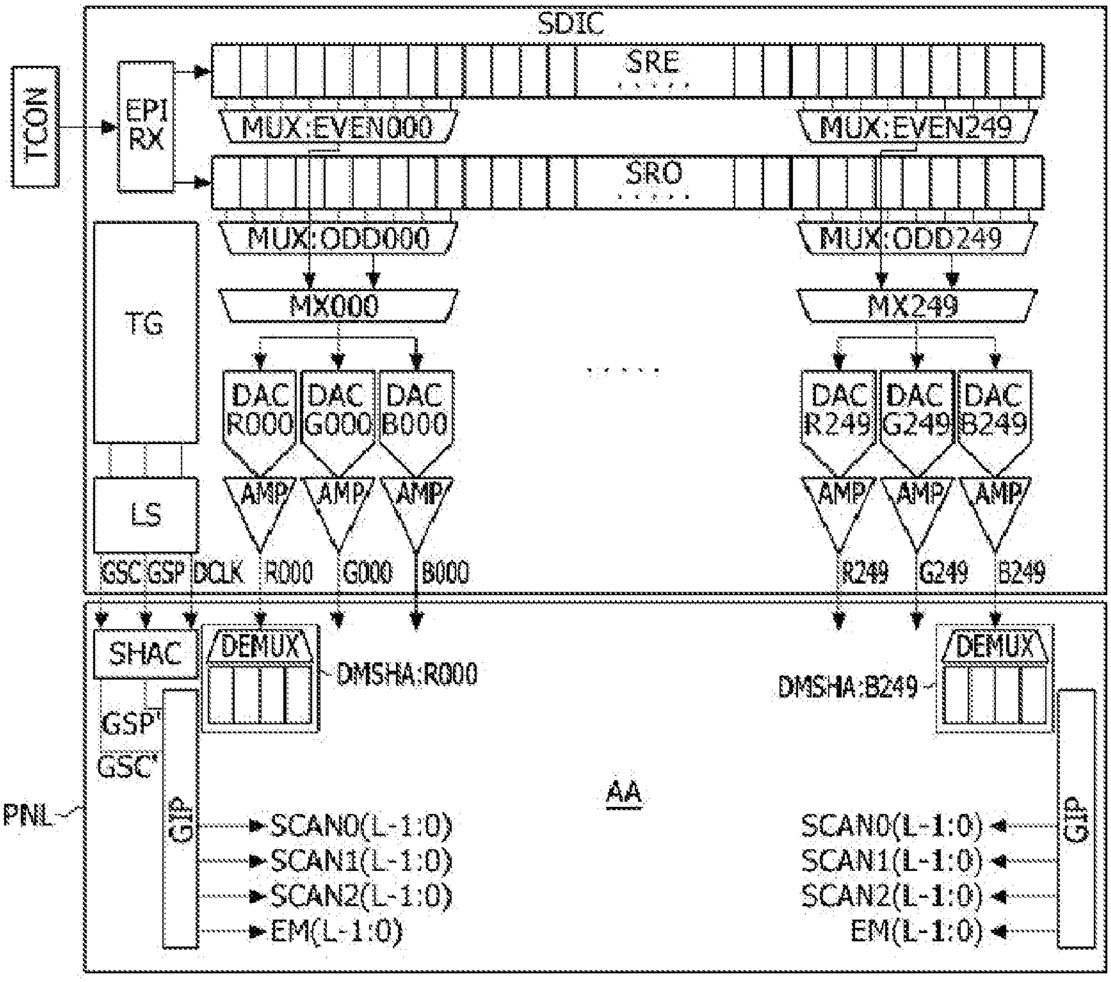
FIG. 12 is a circuit diagram illustrating a drive IC according to another aspect of the present disclosure.

FIG. 11 is a diagram schematically illustrating a structure of a display panel and an input signal of the display panel according to an aspect of the present disclosure. FIG. 12 is a circuit diagram illustrating a drive IC according to another aspect of the present disclosure. FIG. 13 is a diagram illustrating a demultiplexing unit, a second controller, and a gate driver.

Referring to FIGS. 11 to 12, data SR000, SR001, . . . , SR248, and SR249 are pixel data to be written into the R sub-pixels. Data SG000, SG001, . . . , SG248, and SG249 are pixel data to be written to the G sub-pixels. Data SB000, SB001, . . . , SB248, and SB249 are pixel data to be written to the B sub-pixels. The drive IC SDIC receives the pixel data from the timing controller TCON, converts it into the data voltage, and supplies it to the demultiplexing unit DMSHA.

The drive IC SDIC includes a first shift register SRO for shifting pixel data of odd-numbered pixel lines, a second shift register SRE for shifting pixel data of even-numbered pixel lines, a plurality of first multiplexers MUX:ODD000 to MUX:ODD249 for multiplexing the pixel data of the odd-numbered pixel lines outputted from the first shift register SRO, a plurality of second multiplexers MUX:EVEN000 to MUX:EVEN249 for multiplexing the pixel data of the even-numbered pixel lines outputted from the second shift register SRE, a plurality of third multiplexers MX000 to MX249 for multiplexing the pixel data from the first and second multiplexers MUX:ODD000 to MUX:ODD249 and MUX:EVEN000 to MUX:EVEN249, and a DAC and an output buffer AMP disposed in each of the channels.

The third multiplexers MX000 to MUX249 sequentially select data from the first and second multiplexers MUX:ODD000 to MUX:ODD249 and MUX:EVEN000 to MUX:EVEN249 and distribute the selected data to the DACs.

M*N pixel data R000, G000, and B000 sequentially selected through the first multiplexer MUX:ODD000, the second multiplexer MUX:EVEN000 and the third multiplexer MX000 may be provided to the DACs of three channels. The DAC of a first channel may convert the pixel data R000 into the data voltage Vdata. The DAC of a second channel may convert the pixel data G000 into the data voltage Vdata. The DAC of a third channel may convert the pixel data B000 into the data voltage Vdata.

The drive IC SDIC may further include an interface receiver EPI RX, a first controller TG, and a level shifter LS.

The timing controller TCON may encode a clock in the pixel data and transmit the pixel data having the clock embedded therein to the drive IC SDIC.

The interface receiver EPI RX of the drive IC SDIC may supply the pixel data of the odd-numbered pixel lines received from the timing controller TCON to the first shift register SRO, and may supply the pixel data of the even-numbered pixel lines to the second shift register SRE.

The first controller TG generates a data timing control signal for controlling the operation timing of the drive IC SDIC. The data timing control signal may include a clock for controlling the shift registers SRO and SRE of the drive IC SDIC, a clock for controlling the operation timings of the multiplexers MUX:ODD000 to MUX:ODD249, MUX:EVEN000 to MUX:EVEN249, and MX000 to MX249, a DAC clock, and the like.

The first controller TG generates a DEMUX clock DCLK for controlling the operation timing of the demultiplexer DEMUX, and a gate control signal for controlling the operation timing of the gate driver GIP. The gate control signal may include a gate start pulse GSP and a gate shift clock GSC. The shift register of the gate driver GIP may start to output the scan pulses SCAN0 to SCAN2 in response to the gate start pulse GSP, and may shift the scan pulses SCAN0 to SCAN2 whenever the gate shift clock GSC is inputted.

The display panel PNL may further include a second controller SHAC that receives the gate control signal GSP and GSC and the DEMUX clock DCLK to control the operation timing of the demultiplexing unit DMSHA.

Figure 14A:
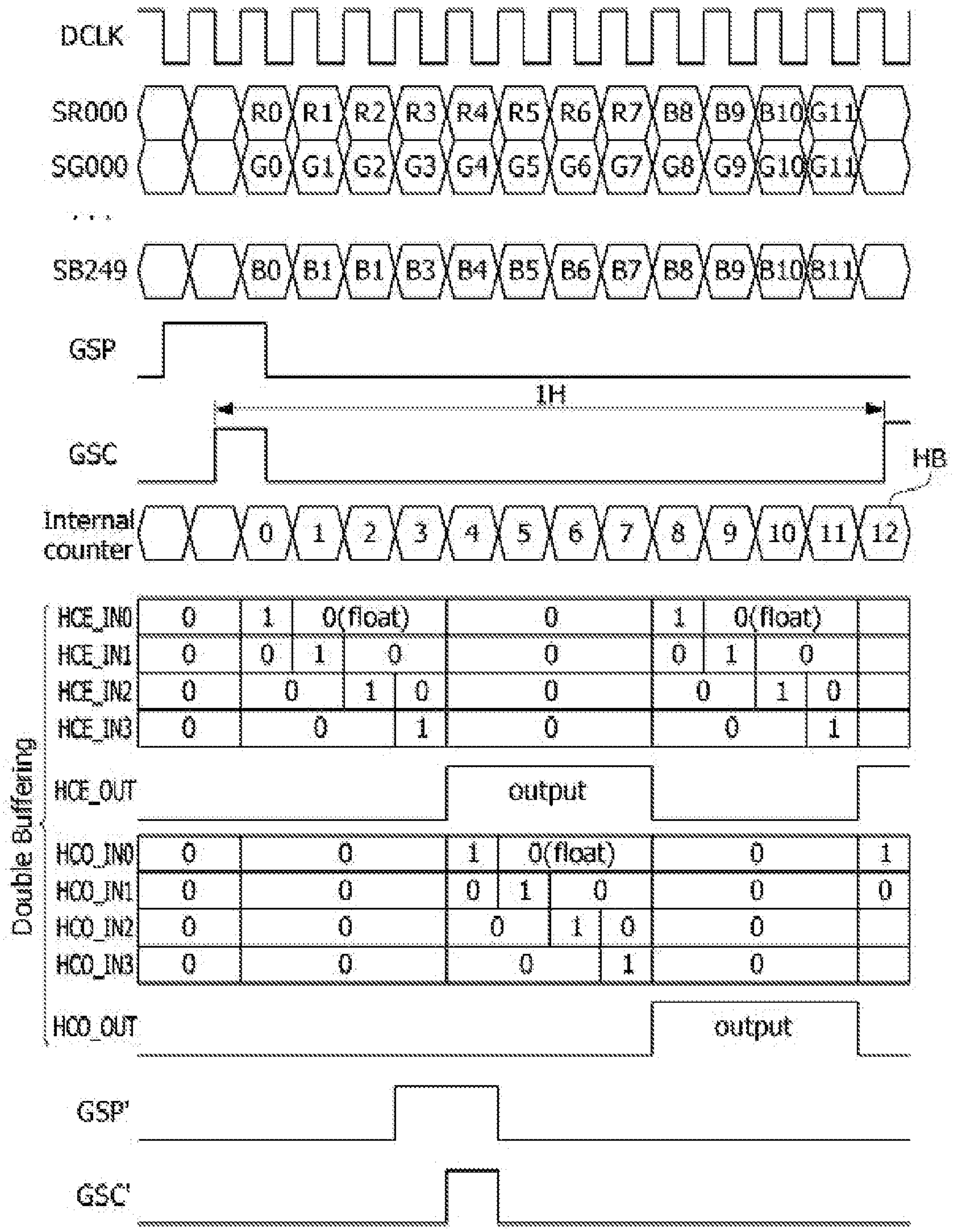
FIGS. 14A and 14B are waveform diagrams illustrating an operation of a display driver shown in FIGS. 11 to 13.

The gate start pulse GSP may be generated once during one frame period to indicate one frame period. The gate shift clock GSC may define one horizontal period. The DEMUX clock DCLK defines the switch timing of the demultiplexer DEMUX. The second controller SHAC may receive timing signals such as GSP, GSC, and DCLK, and may control the operation timing of the demultiplexing unit DMSHA to be synchronized with the drive IC SDIC and the gate driver GIP in every frame period and every horizontal period. As shown in FIG. 14A, a gate control signal GSP' and GSC' outputted from the second controller SHAC may be delayed compared to the gate control signal GSP and GSC generated from the first controller TG.

Figure 14B:
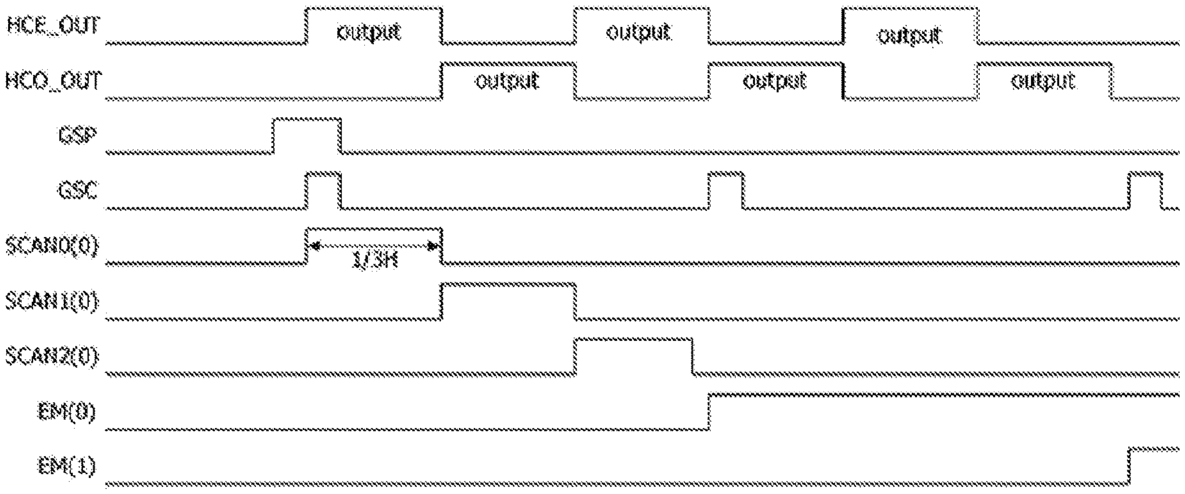

Since the voltages of the gate control signal GSP and GSC and the DEMUX clock DCLK outputted from the first controller TG are digital logic voltages having low voltage, they may be converted into voltages required for driving the gate driver GIP and the second controller SHAC driven at a high voltage. The level shifter LS converts the voltages of the gate control signal and the DEMUX clock DCLK inputted as a low voltage signal from the first controller TG into a gate-off voltage and a gate-on voltage of high voltages. The gate control signal GSP and GSC outputted from the level shifter LS is inputted to the gate driver GIP and the second controller SHAC. The DEMUX clock DCLK outputted from the level shifter LS is inputted to the second controller SHAC. In FIG. 14B, SCAN0(0) to SCAN2(0) are scan pulses applied to the first pixel line LINE(0). Following SCAN0(0) to SCAN2(0), the scan pulses applied to the second pixel line LINE(1), which are omitted from FIG. 14B, are applied to the gate lines connected to the sub-pixels SP0 to SP11 of the second pixel line LINE(1).

As shown in FIG. 13, when four sample & holders SHA0 to SHA3 are connected to one 1:M demultiplexer DEMUX, since the control signals HCO_IN and HCE_IN are individually inputted to each of the sample & holders SHA0 to SHA3, they may be generated as 4-bit signals HCO_IN(3:0) and HCE_IN(3:0), respectively. Since the control signals HCO_OUT and HCE_OUT are simultaneously inputted to the sample & holders SHA0 to SHA3, they may be generated as 1-bit signals.

FIGS. 14A and 14B are waveform diagrams illustrating the operation of the display driver shown in FIGS. 11 to 13.

Referring to FIGS. 14A and 14B, RXX is the pixel data DATA to be written to the R sub-pixels, and GXX is the pixel data DATA to be written to the G sub-pixels. BXX is the pixel data DATA to be written to the B sub-pixels.

The drive IC SDIC includes an internal counter for counting the pixel data.

The demultiplexer DEMUX may multiplex the data voltage Vdata of the pixel data DATA in response to the DEMUX clock DCLK synchronized with the pixel data, and may sequentially supply the data voltage Vdata to the sample & holders SHA0 to SHA2. The sample & holders SHA0 to SHA3 may simultaneously output the data voltages Vdata charged in the capacitors CHO and CHE in response to the control signals HCO_OUT and HCE_OUT each having a value of 1. The sub-pixels SP0 to SP11 may sequentially charge the data voltages Vdata outputted from the sample & holders SHA0 to SHA3 in response to the scan pulses SCAN0 to SCAN2.

Emission control signals EM(0) and EM(1) may be generated as gate-on voltages during the emission period of the sub-pixels, and may be simultaneously applied to the sub-pixels SP0 to SP11 of the plurality of pixel lines LINE(0) to LINE(L-1). The emission control signals EM(0) and EM(1) may be shifted along the scan direction of the pixel lines LINE(0) to LINE(L-1) to control the turn on/off period of the sub-pixels SP0 to SP11 for every frame period by a rolling shutter method.

A personal immersive system may be implemented using a mobile terminal system such as a smartphone. In this case, a left-eye image and a right-eye image may be displayed together on the screen of one display panel. In the case of a smartphone, a VR mode is supported as an example of a partial mode. In the VR mode of the smart phone, the left-eye image and the right-eye image may be displayed separately on one display panel.

The display device of the present disclosure is applicable to a personal immersive system such as VR or AR. The personal immersive system of the present disclosure may include a first display panel on which a left-eye image is displayed, a second display panel on which a right-eye image is displayed, a first drive IC that converts pixel data of the left-eye image into the data voltage and supplies it to the first display panel, a first gate driver that sequentially supplies a scan pulse to the first display panel, a second drive IC that converts pixel data of the right-eye image into the data voltage and supplies it to the second display panel, and a second gate driver that sequentially supplies a scan pulse to the second display panel. Each of the first and second display panels may include a circuit layer in which the demultiplexer, the sample & holders, and the pixel circuits of the sub-pixels are disposed. This will be described in conjunction with FIGS. 15 and 16.

Figure 15:
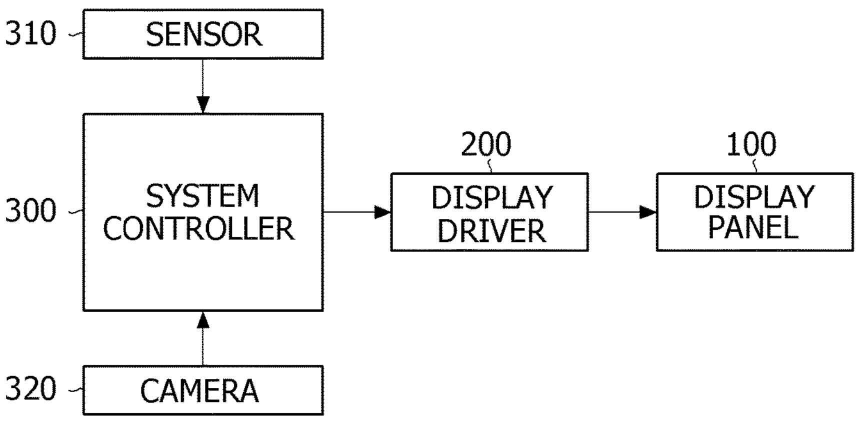
FIGS. 15 and 16 are diagrams illustrating a personal immersive system according to an aspect of the present disclosure.
Figure 16:
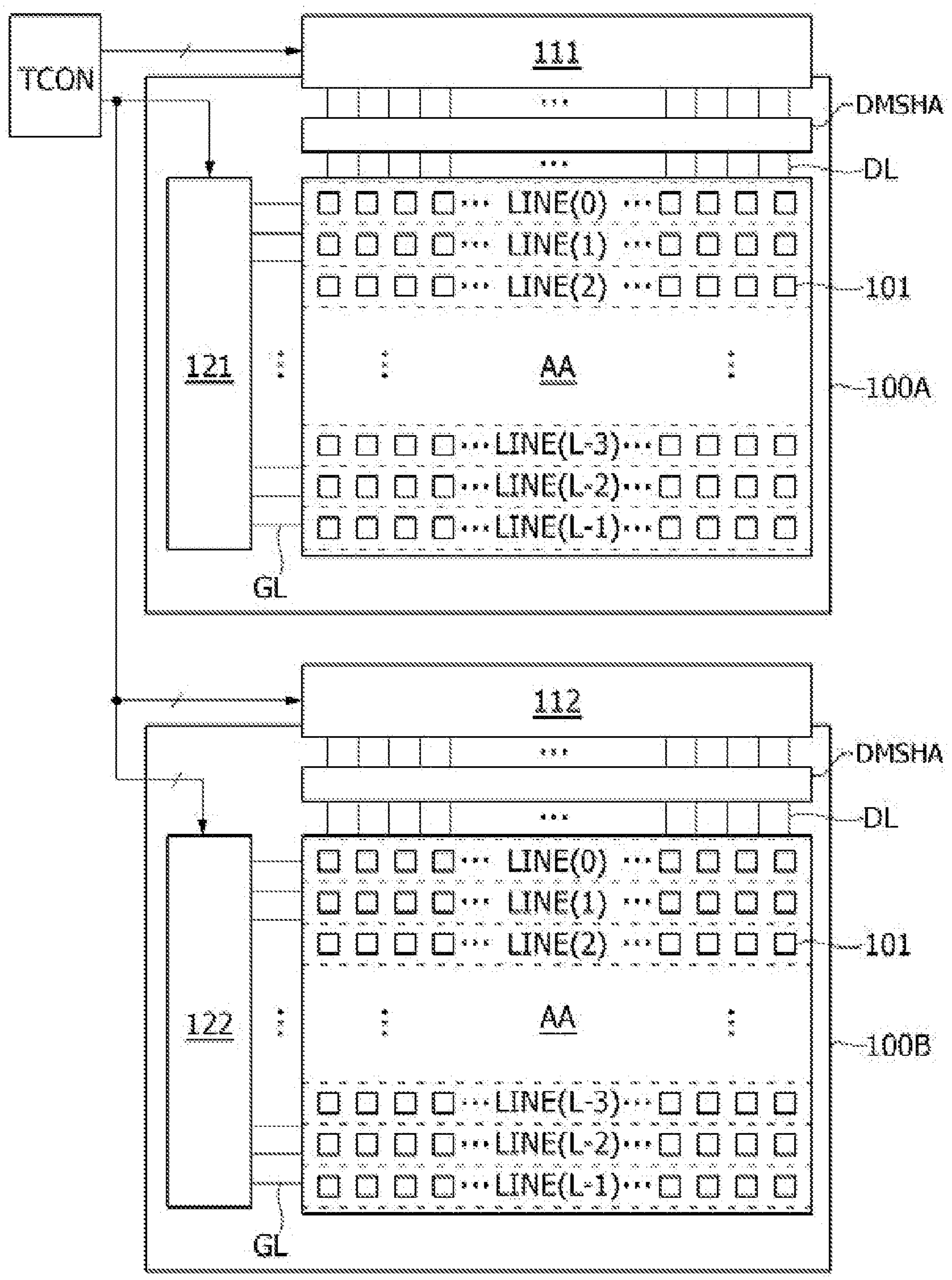

Referring to FIGS. 15 and 16, the display device of the present disclosure includes a display panel 100, a system controller 300, a display driver 200, and the like.

The system controller 300 is connected to a sensor 310, a camera 320, and the like. The system controller 300 further includes an external device interface connected to a memory or an external video source, a user interface for receiving a user command, a power supply unit for generating power, and the like. The external device interface, the user interface, the power supply unit, and the like are omitted from the drawings. The external device interface may be implemented with various well-known interface modules, such as a universal serial bus (USB) and a high definition multimedia interface (HDMI).

The sensor 310 includes various sensors such as a gyro sensor and an acceleration sensor. The sensor 310 transmits the outputs of the various sensors to the system controller 300. The system controller 300 may receive the output of the sensor 310 and move the pixel data of an image displayed on the screen AA in synchronization with a user's movement.

The display driver 200 may include the drive IC SDIC, the gate driver GIP, and the demultiplexing unit DMSHA described above. When the pixel data of the input image is received from the system controller 300, the display driver 200 writes the pixel data to the pixels of the display panel 100.

The display panel PNL may include, as shown in FIG. 16, a first display panel 100A on which a left-eye image is displayed and a second display panel 100B on which a right-eye image is displayed.

The display panels 100A and 100B include data lines DL, gate lines GL, and pixels 101. The screens of the display panels 100A and 100B include a pixel array on which an image is displayed. The pixel array includes the pixel lines LINE(0) to LINE(L-1) sequentially scanned by a scan pulse shifted along the scanning direction to write the pixel data therein.

In the display driver 200, data drivers 111 and 112 and gate drivers 121 and 122 are separated for each of the display panels 100A and 100B, and the timing controller TCON may be shared between the display drivers 200 of the display panels 100A and 100A.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:

a demultiplexer having one input terminal and M output terminals, and configured to sequentially output data voltages through the M output terminals, wherein M is an integer greater than or equal to 2;

M sample & holders respectively connected to the M output terminals of the demultiplexer and configured to sequentially sample the data voltages from the M output terminals of the demultiplexer and then simultaneously output the data voltages, each of the M sample & holders having a corresponding one input terminal and a corresponding one output terminal; and a plurality of sub-pixels divided into two or more sub-pixel groups, each of the two or more sub-pixel groups including N sub-pixels, wherein each of the N sub-pixels in each of the two or more sub-pixel groups is connected to the corresponding one output terminal of a different one of the M sample & holders, and the N sub-pixels are configured to charge the data voltages sequentially inputted from the corresponding one output terminal of the different one of the M sample & holders in response to N scan pulses supplied to the N sub-pixels for one horizontal period, wherein N is an integer greater than or equal to 2, wherein M output terminals of the M sample & holders are connected to M data lines respectively, wherein each of the M data lines is connected to the N sub-pixels disposed in one horizontal line, wherein the N scan pulses are sequentially supplied to the N sub-pixels without overlapping each other, wherein each of the N scan pulses has a gate-on period shorter than 1/N of the one horizontal period, wherein the N sub-pixels are disposed on one horizontal line and connected to N gate lines, respectively, and wherein the N scan pulses are supplied to the N gate lines, respectively.

2. The display panel of claim 1, further comprising:

a data pad region including a plurality of data pads configured to receive the data voltages;

and a data feeding node configured to connect a data pad corresponding to the demultiplexer to an input terminal of the demultiplexer.

3. The display panel of claim 2, wherein a resolution of the display panel is K*L, and a number of the plurality of data pads is (3*K)/(M*N), wherein K and L are integers greater than or equal to 2.

4. The display panel of claim 1, wherein the N sub-pixels include at least first, second and third sub-pixels configured to charge the data voltages for one horizontal period, the first sub-pixel charges a first data voltage in response to a first scan pulse, the second sub-pixel charges a second data voltage in response to a second scan pulse generated after the first scan pulse, and the third sub-pixel charges a third data voltage in response to a third scan pulse generated after the second scan pulse.

5. The display panel of claim 1, wherein the one of the M sample & holders is configured to simultaneously sample an input data voltage received from the demultiplexer and output a previously sampled data voltage to corresponding data line.

6. The display panel of claim 5, wherein the one of the M sample & holders includes:

an input buffer configured to receive the data voltage;

a first capacitor configured to charge the data voltage;

a second capacitor configured to charge the data voltage;

a first switch element configured to supply the data voltage to the first capacitor;

a second switch element configured to supply the data voltage to the second capacitor; and an output buffer configured to output the voltage charged in the first and second capacitors to the data line through the first and second switch elements, wherein the first and second switch elements are configured to alternately connected to an output terminal of the input buffer and an input terminal of the output buffer.

7. The display panel of claim 6, wherein the M sample & holders are configured to individually receive a first control signal for controlling an input timing and simultaneously receive a second control signal for controlling an output timing.

8. The display panel of claim 1, further comprising a controller for controlling operation timings of the demultiplexer and the M sample & holders.

9. The display panel of claim 8, further comprising a gate driver configured to sequentially supply the N scan pulses to the N sub-pixels, wherein the controller is configured to control an operation timing of the gate driver.

10. The display panel of claim 1, further comprising:

a silicon backplane; and a circuit layer disposed on the silicon backplane, wherein the demultiplexer, the M sample & holders, and pixel circuits of the N sub-pixels are disposed in the circuit layer.

11. A display device comprising:

a display panel including a plurality of data lines, a plurality of gate lines intersecting the data lines, a plurality of sub-pixels connected to the data lines and the gate lines, a demultiplexer having one input terminal and M output terminals, and configured to sequentially output data voltages through the M output terminals, and M sample & holders respectively connected to the M output terminals of the demultiplexer and configured to sequentially sample data voltages from the M output terminals of the demultiplexer and then simultaneously output the data voltages, each of the M sample & holders having a corresponding one input terminal and a corresponding one output terminal, wherein M is an integer greater than or equal to 2;

a drive IC configured to convert pixel data of an input image into the data voltage and supply it to the demultiplexer; and a gate driver configured to sequentially supply N scan pulses to the gate lines, every N sub-pixels of the plurality of sub-pixels are connected to the corresponding one output terminal of a different one of the M sample & holders and configured to sequentially charge the data voltages inputted from the corresponding one output terminal of the different one of the M samples & holders in response to the N scan pulses supplied to the N sub-pixels for one horizontal period, wherein N is an integer greater than or equal to 2, wherein M output terminals of the M sample & holders are connected to M data lines, respectively, wherein each of the M data lines is connected to the N sub-pixels disposed in one horizontal line, wherein the N scan pulses are sequentially supplied to the N sub-pixels without overlapping each other, wherein each of the N scan pulses has a gate-on period shorter than 1/N of the one horizontal period, wherein the N sub-pixels are disposed on one horizontal line and connected to N gate lines, respectively, and wherein the N scan pulses are supplied to the N gate lines, respectively.

12. The display device of claim 11, wherein the drive IC includes:

a first shift register configured to shift pixel data of odd-numbered pixel lines;

a second shift register configured to shift pixel data of even-numbered pixel lines;

a plurality of first multiplexers configured to multiplex pixel data received from the first shift register;

a plurality of second multiplexers configured to multiplex pixel data received from the second shift register;

a plurality of third multiplexers configured to multiplex pixel data received from the first and second multiplexers;

a plurality of digital-to-analog converters disposed respectively on channels of the drive IC and configured to convert pixel data from the third multiplexers into the data voltages; and an output buffer disposed on each channel of the drive IC and configured to supply the data voltage from the digital-to-analog converter to the demultiplexer.

13. The display device of claim 11, wherein a resolution of the display panel is K*L, and a number of data pads is (3*K)/(M*N), wherein K and L are integers greater than or equal to 2 and the data pads are configured to receive the data voltages.

14. The display device of claim 12, wherein the drive IC further includes:

a first controller configured to generate control signals including a DEMUX control signal for controlling the demultiplexer, a MUX control signal for controlling the plurality of multiplexers, and a first gate control signal for controlling the gate driver; and a level shifter configured to convert a voltage of the DEMUX control signal and the first gate control signal received as a low voltage signal from the first controller into a gate-off voltage and a gate-on voltage of high voltages.

15. The display device of claim 14, wherein the display panel further includes a second controller configured to receive the DEMUX control signal and the first gate control signal from the level shifter to control operation timings of the demultiplexer, and the gate driver, and output a second gate control signal delayed compared to the first gate control signal generated from the first controller.

16. A personal immersive system comprising:

a first display panel on which a left-eye image is displayed;

a second display panel on which a right-eye image is displayed;

a first drive IC configured to convert pixel data of the left-eye image into data voltages to be supplied to data lines of the first display panel;

a first gate driver configured to sequentially supply N scan pulses to gate lines of the first display panel;

a second drive IC configured to convert pixel data of the right-eye image into data voltages to be supplied to data lines of the second display panel; and a second gate driver configured to sequentially supply the N scan pulses to gate lines of the second display panel, wherein each of the first and second display panels includes:

a plurality of data lines;

a plurality of gate lines intersecting the data lines;

a plurality of sub-pixels connected to the data lines and the gate lines;

a demultiplexer having one input terminal and M output terminals, and configured to sequentially output the data voltages through the M output terminals, wherein M is an integer greater than or equal to 2; and M samples & holders respectively connected to the M output terminals of the demultiplexer and configured to sequentially sample data voltages from the M output terminals of the demultiplexer and simultaneously output the data voltages, each of the M sample & holders having a corresponding one input terminal and a corresponding one output terminal; and every N sub-pixels of the plurality of sub-pixels in each of the first and second display panels are connected to the corresponding one output terminal of a different one of the M sample & holders and configured to sequentially charge the data voltages inputted from the corresponding one output terminal of the different one of the M samples & holders in response to the N scan pulses supplied to the N sub-pixels disposed in one horizontal line via N gate lines for one horizontal period, wherein N is an integer greater than or equal to 2, wherein M output terminals of the M sample & holders are connected to M data lines, respectively, wherein each of the M data lines is connected to the N sub-pixels disposed in one horizontal line, wherein the N scan pulses are sequentially supplied to the N sub-pixels without overlapping each other, wherein each of the N scan pulses has a gate-on period shorter than 1/N of the one horizontal period, wherein the N sub-pixels are disposed on one horizontal line and connected to N gate lines, respectively, and wherein the N scan pulses are supplied to the N gate lines, respectively.

17. The personal immersive system of claim 16, wherein each of the first and second display panels further includes:

a silicon backplane; and a circuit layer disposed on the silicon backplane, wherein the demultiplexer, the M sample & holders, and pixel circuits of the N sub-pixels are disposed in the circuit layer.

* * * * *